US011504788B2

(12) United States Patent
Albright et al.

(10) Patent No.: US 11,504,788 B2
(45) Date of Patent: *Nov. 22, 2022

(54) DUAL WIRE WELDING OR ADDITIVE MANUFACTURING SYSTEM AND METHOD

(71) Applicant: Lincoln Global, Inc., Santa Fe Springs, CA (US)

(72) Inventors: Matthew A. Albright, Thomson, OH (US); Matthew A. Weeks, Walloon (AU); Steven R. Peters, Huntsburg, OH (US); Andrew R. Peters, Chesterland, OH (US); Bruce J. Chantry, Solon, OH (US)

(73) Assignee: Lincoln Global, Inc., Santa Fe Springs, CA (US)

(*) Notice: Subject to any disclaimer, the term of this patent is extended or adjusted under 35 U.S.C. 154(b) by 157 days.

This patent is subject to a terminal disclaimer.

(21) Appl. No.: 16/773,074

(22) Filed: Jan. 27, 2020

(65) Prior Publication Data

US 2020/0156171 A1 May 21, 2020

Related U.S. Application Data

(63) Continuation-in-part of application No. 15/671,295, filed on Aug. 8, 2017, now Pat. No. 10,792,752.

(51) Int. Cl.
*B23K 15/00* (2006.01)
*B23K 9/067* (2006.01)
(Continued)

(52) U.S. Cl.
CPC ............ *B23K 9/067* (2013.01); *B23K 9/1006* (2013.01); *B23K 9/133* (2013.01); *B33Y 30/00* (2014.12)

(58) Field of Classification Search
CPC ...... B22F 10/20; B22F 12/00; B22F 2999/00; B22F 2003/1056; B22F 3/1055;
(Continued)

(56) References Cited

U.S. PATENT DOCUMENTS 1,368,287 A 2/1921 Pennington et al.
1,605,860 A 11/1926 Snelling
(Continued)

FOREIGN PATENT DOCUMENTS

CN 2683302 Y 3/2005
CN 101745726 A 6/2010
(Continued)

OTHER PUBLICATIONS

Shi, et al.; "Physical Characteristics of Twin-Wire Indirect Arc Plasma;" Vacuum; vol. 107; Dated Apr. 3, 2014; pp. 41-50.
(Continued)

*Primary Examiner* — Sang Y Paik
(74) *Attorney, Agent, or Firm* — Brad C. Spencer

(57) ABSTRACT

A welding or additive manufacturing system includes a power supply having a controller which controls operation of the power supply. The power supply provides a current waveform to a contact tip assembly having a first bore terminating at a first exit orifice and a second bore terminating at a second exit orifice. The first exit orifice is configured to deliver a first wire electrode and said second exit orifice is configured to deliver a second wire electrode. The exit orifices are separated from each other by a distance configured to facilitate formation of a bridge droplet between the wire electrodes while preventing solid portions of the first wire electrode delivered through the first bore from contacting solid portions of the second wire electrode delivered through the second bore, during a deposition operation in which the current waveform is conducted to
(Continued)

both of the wire electrodes simultaneously through the contact tip assembly.

34 Claims, 17 Drawing Sheets

(51) Int. Cl.
*B23K 9/133* (2006.01)
*B23K 9/10* (2006.01)
*B33Y 30/00* (2015.01)

(58) Field of Classification Search
CPC .... C22C 1/05; C22C 9/06; B23K 9/02; B23K 9/04; B23K 9/067; B23K 9/092; B23K 9/1006; B23K 9/121; B23K 9/123; B23K 9/133; B23K 26/1423; B23K 26/211; B23K 9/0017; B23K 9/0672; B23K 9/124; B23K 9/1333; B23K 9/1336; B23K 9/1735; B23K 9/188; B33Y 10/00; B33Y 30/00; G05B 19/4099; Y02P 10/25
USPC .............. 219/121.11–121.17, 121.36–121.59
See application file for complete search history.

(56) References Cited

U.S. PATENT DOCUMENTS

| | | | |
|---|---|---|---|
| 2,583,507 A | 1/1952 | Carpenter et al. | |
| 2,594,333 A | 4/1952 | Medicus | |
| 2,756,311 A | 7/1956 | Persson et al. | |
| 2,849,593 A | 8/1958 | Volff et al. | |
| 2,866,079 A | 12/1958 | Morley | |
| 2,911,517 A | 11/1959 | Armstrong | |
| 2,957,101 A | 10/1960 | Barkley | |
| 3,131,325 A | 4/1964 | Briggs | |
| 3,274,371 A | 9/1966 | Saenger, Jr. | |
| 3,328,556 A | 6/1967 | Nelson | |
| 3,384,778 A | 5/1968 | Jeannette | |
| 3,624,345 A | 11/1971 | Armstrong | |
| 3,693,858 A | 9/1972 | Araya | |
| 3,694,620 A | 9/1972 | Gleason | |
| 3,746,833 A | 7/1973 | Ujiie | |
| 3,933,533 A | 1/1976 | Uchida | |
| 4,012,621 A | 3/1977 | Uchida | |
| 4,088,866 A | 5/1978 | Lund et al. | |
| 4,182,947 A | 1/1980 | Brower | |
| 4,295,746 A | 10/1981 | Hartmann | |
| 4,336,441 A | 6/1982 | Godai | |
| 4,437,906 A | 3/1984 | Tateishi | |
| 4,475,996 A | 10/1984 | Inoue | |
| 4,541,616 A | 9/1985 | Dean | |
| 4,697,791 A | 10/1987 | Henderson et al. | |
| 4,743,731 A | 5/1988 | Souring | |
| 4,902,873 A | 2/1990 | Ivannikov | |
| 4,968,867 A | 11/1990 | Banzai | |
| 5,148,001 A | 9/1992 | Stava | |
| 5,324,552 A | 6/1994 | Opower | |
| 5,440,100 A | 8/1995 | Stuart et al. | |
| 5,491,321 A | 2/1996 | Stuart | |
| 5,635,091 A | 6/1997 | Hori et al. | |
| 5,714,735 A | 2/1998 | Offer | |
| 5,782,987 A | 7/1998 | Furman | |
| 5,791,560 A * | 8/1998 | Rogers ................... C23C 4/131 | |
| | | | 239/8 |
| 5,816,466 A | 10/1998 | Seufer | |
| 5,958,261 A | 9/1999 | Offer | |
| 5,977,504 A | 11/1999 | Offer | |
| 5,981,906 A | 11/1999 | Parker | |
| 6,172,333 B1 * | 1/2001 | Stava ................... B23K 9/1735 | |
| | | | 219/137 PS |
| 6,225,589 B1 | 5/2001 | Bartok | |
| 6,374,655 B1 | 4/2002 | Hresc | |
| 6,512,200 B2 | 1/2003 | Norrish et al. | |
| 6,512,220 B1 | 1/2003 | Park | |
| 6,627,839 B1 | 9/2003 | Luckowski | |
| 6,683,271 B2 | 1/2004 | Rogers | |
| 6,683,279 B1 | 1/2004 | Moerke | |
| 6,737,616 B1 | 5/2004 | Sherrill | |
| 7,112,759 B1 | 9/2006 | Severance, Jr. | |
| 7,183,516 B2 | 2/2007 | Blankenship | |
| 7,429,716 B2 | 9/2008 | Bong et al. | |
| 7,495,192 B2 | 2/2009 | Takahashi | |
| 7,525,067 B2 | 4/2009 | Diez | |
| 7,705,269 B2 | 4/2010 | Daniel | |
| 7,761,336 B1 | 7/2010 | Blankenship et al. | |
| 7,777,447 B2 | 8/2010 | Vogel | |
| 8,049,139 B2 | 11/2011 | Houston | |
| 8,723,082 B2 | 5/2014 | Spiesberger | |
| 9,186,745 B2 | 11/2015 | Jia et al. | |
| 9,839,970 B2 | 12/2017 | Peters et al. | |
| 9,862,056 B2 | 1/2018 | Berger et al. | |
| 9,895,760 B2 | 2/2018 | Peters | |
| 9,937,577 B2 | 4/2018 | Daniel et al. | |
| 10,052,707 B2 | 8/2018 | Henry et al. | |
| 10,792,752 B2 * | 10/2020 | Weeks ................... B23K 9/188 | |
| 2001/0008235 A1 | 7/2001 | Miszczak et al. | |
| 2003/0209530 A1 | 11/2003 | Stuart et al. | |
| 2004/0016735 A1 | 1/2004 | Huismann et al. | |
| 2005/0218132 A1 | 10/2005 | Wells | |
| 2005/0224486 A1 | 10/2005 | Matiash | |
| 2005/0230373 A1 | 10/2005 | Kensrue | |
| 2006/0070985 A1 | 4/2006 | Nakabayashi et al. | |
| 2006/0138115 A1 | 6/2006 | Norrish et al. | |
| 2006/0226137 A1 | 10/2006 | Huismann et al. | |
| 2006/0243704 A1 | 11/2006 | Matz et al. | |
| 2007/0145028 A1 | 6/2007 | Artelsmair | |
| 2007/0151964 A1 | 7/2007 | Artelsmair et al. | |
| 2007/0158324 A1 * | 7/2007 | O'Donnell ............ B23K 9/1068 | |
| | | | 219/137.71 |
| 2007/0164074 A1 | 7/2007 | Schorghuber et al. | |
| 2008/0128395 A1 | 6/2008 | Aigner et al. | |
| 2008/0169336 A1 | 7/2008 | Spiegel et al. | |
| 2008/0190900 A1 | 8/2008 | Zhang et al. | |
| 2009/0050609 A1 | 2/2009 | Berger et al. | |
| 2009/0234483 A1 | 9/2009 | Leko et al. | |
| 2010/0213179 A1 | 8/2010 | Peters | |
| 2010/0301030 A1 | 12/2010 | Zhang et al. | |
| 2010/0314373 A1 | 12/2010 | Patterson | |
| 2011/0171393 A1 * | 7/2011 | Margolies ................ B23K 9/24 | |
| | | | 427/449 |
| 2011/0309062 A1 | 12/2011 | O'Donnell et al. | |
| 2012/0067859 A1 | 3/2012 | Albrecht et al. | |
| 2012/0074115 A1 | 3/2012 | Kazmaier et al. | |
| 2012/0152921 A1 | 6/2012 | Peters et al. | |
| 2012/0285938 A1 | 11/2012 | McFadden et al. | |
| 2013/0264323 A1 | 10/2013 | Daniel | |
| 2014/0027413 A1 | 1/2014 | Lin et al. | |
| 2014/0166633 A1 | 6/2014 | Albrecht | |
| 2014/0197148 A1 | 7/2014 | Chen et al. | |
| 2015/0209889 A1 | 7/2015 | Peters et al. | |
| 2016/0228972 A1 | 8/2016 | Jogdand et al. | |
| 2016/0368075 A1 | 12/2016 | Ide | |
| 2017/0080511 A1 | 3/2017 | Jaeger et al. | |
| 2017/0165779 A1 | 6/2017 | Barhorst et al. | |
| 2017/0189982 A1 | 7/2017 | Hsu | |
| 2017/0368629 A1 | 12/2017 | Grigorenko | |
| 2018/0207744 A1 | 7/2018 | Stoecker | |
| 2018/0214966 A1 | 8/2018 | Peters | |
| 2018/0214967 A1 | 8/2018 | Peters | |
| 2018/0214972 A1 | 8/2018 | Jansma et al. | |
| 2018/0214973 A1 | 8/2018 | Jansma et al. | |
| 2018/0281097 A1 | 10/2018 | Jansma | |
| 2019/0047069 A1 | 2/2019 | Weeks et al. | |
| 2019/0168334 A1 | 6/2019 | Kooken et al. | |
| 2019/0201997 A1 | 7/2019 | Stergios et al. | |

FOREIGN PATENT DOCUMENTS

| | | |
|---|---|---|
| CN | 101870032 A | 10/2010 |
| CN | 102615398 A | 8/2012 |
| CN | 102430846 B | 5/2013 |
| CN | 103071899 A | 5/2013 |
| CN | 103170713 A | 6/2013 |

(56) References Cited

FOREIGN PATENT DOCUMENTS

| | | |
|---|---|---|
| CN | 103648702 A | 3/2014 |
| CN | 101712095 B | 9/2014 |
| CN | 104096948 A | 10/2014 |
| CN | 104334305 A | 2/2015 |
| CN | 104439623 A | 3/2015 |
| CN | 205464747 U | 8/2016 |
| CN | 105983742 A | 10/2016 |
| CN | 106270978 A | 1/2017 |
| CN | 104972205 B | 4/2017 |
| CN | 106670630 A | 5/2017 |
| CN | 106735769 A | 5/2017 |
| CN | 206241445 U | 6/2017 |
| CN | 206578445 U | 10/2017 |
| CN | 109382566 A | 2/2019 |
| DE | 1115 382 B | 10/1961 |
| DE | 2 108 614 A1 | 10/1971 |
| DE | 42 04 661 C1 | 6/1993 |
| DE | 196 11 583 A1 | 9/1997 |
| DE | 196 11 597 A1 | 9/1997 |
| DE | 298 19 828 U1 | 11/1999 |
| DE | 197 38 785 C2 | 12/2001 |
| DE | 10 2008 014915 A1 | 11/2009 |
| DE | 20 2013 102 979 U1 | 7/2013 |
| DE | 10 2016 003468 A1 | 9/2016 |
| DE | 10 2015 122135 A1 | 6/2017 |
| EP | 1707296 A1 | 10/2006 |
| EP | 1 294 522 B1 | 9/2007 |
| EP | 3446821 A1 | 2/2019 |
| EP | 3 656 497 A2 | 5/2020 |
| EP | 3 693 116 A1 | 8/2020 |
| GB | 990208 A | 4/1965 |
| GB | 1 502 288 A | 3/1978 |
| GB | 2 058 637 A | 4/1981 |
| JP | H02-258168 A | 10/1990 |
| JP | 02-280968 A | 11/1990 |
| JP | 04053617 B | 8/1992 |
| JP | H09-267170 A | 10/1997 |
| JP | H10-113771 A | 5/1998 |
| JP | 2008-055506 A | 3/2008 |
| JP | 2008-087045 A | 4/2008 |
| JP | 2010-069494 A | 4/2010 |
| JP | 2010-082624 A | 4/2010 |
| JP | 5133079 B2 | 1/2013 |
| JP | 2013-039624 A | 2/2013 |
| JP | 5157006 B2 | 3/2013 |
| JP | 5580869 B2 | 8/2014 |
| JP | 6137053 B2 | 5/2017 |
| KR | 2001-0002945 A | 1/2001 |
| KR | 10-2010-0115997 A | 10/2010 |
| KR | 10-1412374 B1 | 6/2014 |
| SU | 1237347 A1 | 6/1986 |
| WO | 1997045227 A1 | 12/1997 |
| WO | 2010/080411 A1 | 7/2010 |
| WO | 2012/153177 A1 | 11/2012 |

OTHER PUBLICATIONS

Extended European Search Report from Corresponding Application No. 19205296.7; dated Aug. 13, 2020; pp. 1-13.

Extended European Search Report from Corresponding Application No. 19205356.9; dated Aug. 13, 2020; pp. 1-9.

Wolf Robotics; "Tandem Wire MIG Welding"; dated Aug. 29, 2007; pp. 1-8.

Leng, et al.; "The characteristic of twin-electrode TIG coupling arc pressure"; Journal of Physics D: Applied Physics; vol. 39(6):1120; dated Mar. 3, 2006.

D/F Machine Specialties; "D/F Automatic & Robotic MIG Tandem Torch"; https://www.dfmachinespecialties.com/index.php?option=com_content&view=article&id=35; Accessed on Oct. 15, 2018; pp. 1-4.

Ye, et al.; "Research on arc interference and welding operating point change of twin wire MIG welding"; The International Journal of Advanced Manufacturing Technology; vol. 89, Issue 1-4; dated Mar. 2017; pp. 493-502.

Ueyama, et al.; "Effects of torch configuration and welding current on weld bead formation in high speed tandem pulsed gas metal arc welding of steel sheets"; Science and Technology of Welding and Joining; vol. 10, No. 6; Dated 2005; Published Online Dec. 4, 2013; pp. 750-759.

Fronius; "CMT Twin"; https://www.fronius.com/en/welding-technology/products/robotic-welding/migmag-high-performance/cmt-twin/cmt-twin; Accessed on Oct. 15, 2018; pp. 1-5.

SKS Welding Systems; "Dual Wire 2.0 for double-speed welding"; https://www.sks-welding.com/en/torch-systems/dual-wire/dual-wire-20/product.html; Accessed on Oct. 15, 2018; pp. 1-2.

Lincoln Electric; "Tandem MIG™ 800 Amp Welding Torch"; https://www.lincolnelectric.com/assets/US/EN/literature/E10601.pdf; Accessed on Oct. 15, 2018; pp. 1-4.

Wire Wizard; "Weld Cell Monitoring and Optimization System"; https://www.wire-wizard.com/ELCoCatalog_web.pdf Accessed on Oct. 17, 2018; p. 42.

Lincoln Electric; "Wire Level Gauge"; https://www.lincolnelectric.com/assets/us/en/literature/mc0995.pdf Accessed on Oct. 17, 2018; p. 6.

Miller; Auto-Continuum 350 And 500 w/ Insight Core User Manual; https://www.millerwelds.com/files/owners-manuals/O273473D_MIL.pdf; Dated Nov. 2016; Section 8, pp. 40-43.

Extended European Search Report from Corresponding Application No. 18187717.6; dated Jan. 4, 2019; pp. 1-10.

Extended European Search Report for Corresponding Application No. 21156359.8; dated Jul. 9, 2021; pp. 1-8.

Extended European Search Report for Corresponding Application No. 21153533.1; dated Jul. 20, 2021; pp. 1-9.

* cited by examiner

DUAL WIRE WELDING OR ADDITIVE MANUFACTURING SYSTEM AND METHOD

CROSS-REFERENCE TO RELATED APPLICATIONS

This application is a continuation-in-part of U.S. patent application Ser. No. 15/671,295 filed on Aug. 8, 2017, which is incorporated herein by reference.

BACKGROUND OF THE INVENTION

Field of the Invention

Devices, systems, and methods consistent with the invention relate to material deposition with a dual wire configuration.

Description of the Related Art

When welding, it is often desirable to increase the width of the weld bead or increase the length of the weld puddle. There can be many different reasons for this desire, which are well known in the welding industry. For example, it may be desirable to elongate the weld puddle to keep the weld and filler metals molten for a longer period of time so as to reduce porosity. That is, if the weld puddle is molten for a longer period of time there is more time for harmful gases to escape the weld bead before the bead solidifies. Further, it may desirable to increase the width of a weld bead so as to cover wider weld gap or to increase a wire deposition rate. In both cases, it is common to use an increased electrode diameter. The increased diameter will result in both an elongated and widened weld puddle, even though it may be only desired to increase the width or the length of the weld puddle, but not both. However, this is not without its disadvantages. Specifically, because a larger electrode is employed more energy is needed in the welding arc to facilitate proper welding. This increase in energy causes an increase in heat input into the weld and will result in the use of more energy in the welding operation, because of the larger diameter of the electrode used. Further, it may create a weld bead profile or cross-section that is not ideal for certain mechanical applications. Rather than increasing the diameter of the electrode, it may be desirable to use at least two smaller electrodes simultaneously.

BRIEF SUMMARY OF THE INVENTION

The following summary presents a simplified summary in order to provide a basic understanding of some aspects of the devices, systems and/or methods discussed herein. This summary is not an extensive overview of the devices, systems and/or methods discussed herein. It is not intended to identify critical elements or to delineate the scope of such devices, systems and/or methods. Its sole purpose is to present some concepts in a simplified form as a prelude to the more detailed description that is presented later.

In accordance with one aspect of the present invention, provided is a welding or additive manufacturing system. The system includes a power supply comprising a controller which controls operation of the power supply. The power supply provides a current waveform to a contact tip assembly having a first bore terminating at a first exit orifice and a second bore terminating at a second exit orifice. The first exit orifice is configured to deliver a first wire electrode and said second exit orifice is configured to deliver a second wire electrode. The first and second exit orifices are separated from each other by a distance configured to facilitate formation of a bridge droplet between the first wire electrode delivered through the first bore and the second wire electrode delivered through the second bore, while preventing solid portions of the first wire electrode delivered through the first bore from contacting solid portions of the second wire electrode delivered through the second bore, during a deposition operation in which the current waveform is conducted to both of the first wire electrode and the second wire electrode simultaneously through the contact tip assembly.

In accordance with another aspect of the present invention, provided is a welding or additive manufacturing system. The system includes a power supply comprising a controller which controls operation of the power supply. The power supply provides a current waveform to a contact tip assembly having a first bore terminating at a first exit orifice and a second bore terminating at a second exit orifice. A first wire feeder delivers a first wire electrode through the first exit orifice, and a second wire feeder delivers a second wire electrode through the second exit orifice. The first and second exit orifices are separated from each other by a distance configured to facilitate formation of a bridge droplet between the first wire electrode delivered through the first bore and the second wire electrode delivered through the second bore, while preventing solid portions of the first wire electrode delivered through the first bore from contacting solid portions of the second wire electrode delivered through the second bore, during a deposition operation in which the current waveform is conducted to both of the first wire electrode and the second wire electrode simultaneously through the contact tip assembly.

In accordance with another aspect of the present invention, provided is a welding or additive manufacturing system. The system includes a power supply comprising a controller which controls operation of the power supply. The power supply provides a current waveform to a contact tip assembly having a first bore terminating at a first exit orifice and a second bore terminating at a second exit orifice. The first exit orifice is configured to deliver a first wire electrode and the second exit orifice is configured to deliver a second wire electrode. The system further includes at least one wire feeder, wherein the at least one wire feeder drives the first wire electrode through the first bore and the second wire electrode through the second bore. The first and second exit orifices are separated from each other by a distance configured to facilitate formation of a bridge droplet between the first wire electrode delivered through the first bore and the second wire electrode delivered through the second bore, while preventing solid portions of the first wire electrode delivered through the first bore from contacting solid portions of the second wire electrode delivered through the second bore, during a deposition operation in which the current waveform is conducted to both of the first wire electrode and the second wire electrode simultaneously through the contact tip assembly.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION OF EXEMPLARY EMBODIMENTS

Figure 1:
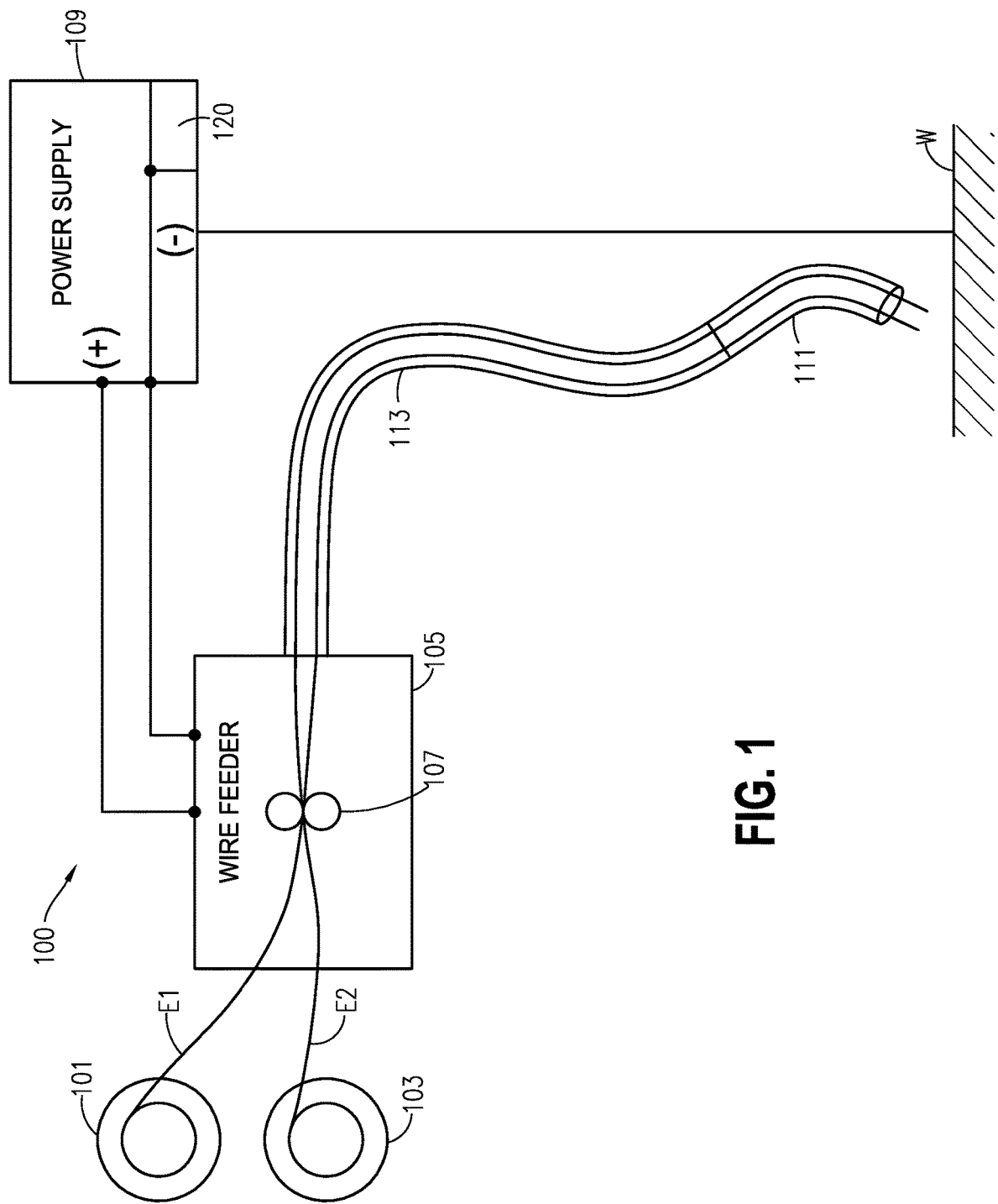
FIG. 1 illustrates a diagrammatical representation of an exemplary embodiment of a welding system of the present invention.

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. Any disjunctive word or phrase presenting two or more alternative terms, whether in the description of embodiments, claims, or drawings, should be understood to contemplate the possibilities of including one of the terms, either of the terms, or both terms. For example, the phrase "A or B" should be understood to include the possibilities of "A" or "B" or "A and B."

While embodiments of the present invention discussed herein are discussed in the context of GMAW type welding, other embodiments of the invention are not limited thereto. For example, embodiments can be utilized in SAW and FCAW type welding operations, as well as other similar types of welding operations. Further, while the electrodes described herein are solid electrodes, again, embodiments of the present invention are not limited to the use of solid electrodes as cored electrodes (either flux or metal cored) can also be used without departing from the spirit or scope of the present invention. Further, embodiments of the present invention can also be used in manual, semi-automatic and robotic welding operations. Because such systems are well known, they will not be described in detail herein.

Turning now to the Figures, FIG. 1 depicts an exemplary embodiment of a welding system 100 in accordance with an exemplary embodiment of the present invention. The welding system 100 contains an arc generation power supply, such as welding power source 109, which is coupled to a welding torch 111 (having a contact tip assembly—not shown) via a wire feeder 105. The power source 109 can be any known type of welding power source capable of delivering current and welding waveforms to the torch 111, such as pulse spray, STT and/or short arc type welding waveforms. Because the construction, design and operation of such power supplies are well known, they need not be described in detail herein. The power source 109 outputs welding waveforms to wire electrodes E1 and E2 simultaneously, during a dual wire welding operation, via a contact tip assembly in the welding torch 111. The power source 109 can include a controller 120 which is coupled to a user interface to allow a user to input control or welding parameters for the welding operation. The controller 120 can have a processor, CPU, memory etc. to be used to control the operation of the welding process as described herein. The torch 111, which can be constructed similar to known manual, semi-automatic or robotic welding torches can be coupled to any known or used welding gun and can be of a straight or gooseneck type. The wire feeder 105 draws the electrodes E1 and E2 from electrode sources 101 and 103, respectively, which can be of any known type, such as reels, spools, containers or the like. The wire feeder 105 is of a known construction and employs drive rolls 107 to draw the electrodes E1 and E2 and push the electrodes to the torch 111. In an exemplary embodiment of the present invention, the drive rolls 107 and wire feeder 105 are configured for a single electrode operation. Embodiments of the present invention, using a dual wire configuration, can be utilized with a wire feeder 105 and drive rolls 107 only designed for a single wire feeding operation. For example, drive rolls 107 can be configured for a single 0.045 inch diameter electrode, but will suitable drive two electrodes of a 0.030 inch diameter without modification to the wire feeder 105 or the drive rolls 107. Alternatively, the wire feeder 105 can be designed to provide separate sets of rollers for feeding the electrodes E1/E2 respectively, or have drive rolls specifically configured for feeding two or more electrodes simultaneously (e.g., via trapezoidal-shaped wire receiving grooves around the rollers that can accommodate two electrodes). In other embodiments, two separate wire feeders can also be used. As shown, the wire feeder(s) 105 is in communication with the power source 109 consistent with known configurations of welding operations.

Once driven by the drive rolls 107, the electrodes E1 and E2 are passed through a liner 113 to deliver the electrodes E1 and E2 to the torch 111. The liner 113 is appropriately sized to allow for the passage of the electrodes E1 and E2 to the torch 111. For example, for two 0.030 inch diameter electrodes, a standard 0.0625 inch diameter liner 113 (which is typically used for a single 0.0625 inch diameter electrode) can be used with no modification.

Although the examples referenced above discuss the use of two electrodes having a same diameter, the present invention is not limited in this regard as embodiments can use electrodes of a different diameter. That is, embodiments of the present invention can use an electrode of a first, larger, diameter and an electrode of a second, smaller, diameter. In such an embodiment, it is possible to more conveniently weld two work pieces of different thicknesses. For example, the larger electrode can be oriented to the larger work piece while the smaller electrode can be oriented to the smaller work piece. Further, embodiments of the present invention can be used for many different types of welding operations including, but not limited to, metal inert gas, submerged arc, and flux-cored welding. Further, embodiments of the present invention can be used for automatic, robotic and semi-automatic welding operations. Additionally, embodiments of the present invention can be utilized with different electrode types. For example, it is contemplated that a cored electrode can be coupled with a non-cored electrode. Further, electrodes of differing compositions can be used to achieve the desired weld properties and composition of the final weld bead. Thus, embodiments of the present invention can be utilized in a broad spectrum of welding operations.

Figure 2:
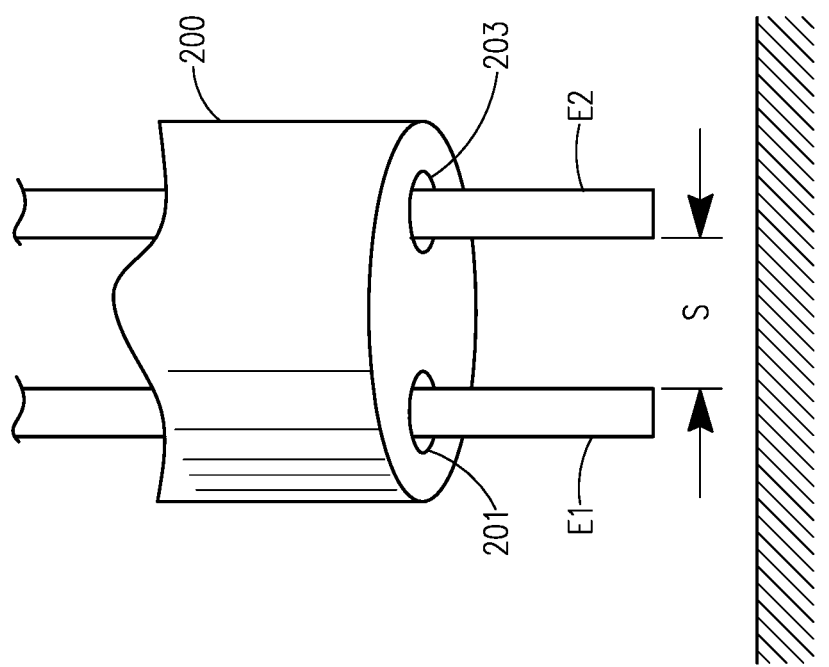
FIG. 2 illustrates a diagrammatical representation of an exemplary contact tip assembly in an embodiment of the present invention.

FIG. 2 depicts an exemplary contact tip assembly 200 of the present invention. The contact tip assembly 200 can be made from known contact tip materials and can be used in any known type of welding gun. As shown in this exemplary embodiment, the contact tip assembly has two separate channels 201 and 203 which run the length of the contact tip assembly 200. During welding a first electrode E1 is passed through the first channel 201 and the second electrode E2 is passed through the second channel 203. The channels 201/203 are typically sized appropriately for the diameter of wire that is to be passed there through. For example, if the electrodes are to have the same diameter the channels will have the same diameters. However, if different diameters are to be used then the channels should be sized appropriately so as to properly transfer current to the electrodes. Additionally, in the embodiment shown, the channels 201/203 are configured such that the electrodes E1/E2 exit the distal end face of the contact tip 200 in a parallel relationship. However, in other exemplary embodiments the channels can be configured such that the electrodes E1/E2 exit the distal end face of the contact tip such that an angle in the range of +/−15° exists between the centerlines of the respective electrodes. The angling can be determined based on the desired performance characteristics of the welding operation. It is further noted that in some exemplary embodiments the contact tip assembly can be a single integrated contact tip with a channels as shown, while in other embodiments the contact tip assembly can be comprised of two contact tip subassemblies located close to each other, where the current is directed to each of the contact tip subassemblies.

As shown in FIG. 2, the respective electrodes E1/E2 are spaced by a distance S which is the distance between the closest edges of the electrodes. In exemplary embodiments of the present invention, this distance is in the range of 0.25 to 4 times the diameter of the larger of the two electrodes E1/E2, while in other exemplary embodiments the distance S is in the range of 2 to 3 times the largest diameter. For example, if each of the electrodes has a diameter of 1 mm, the distance S can be in the range of 2 to 3 mm. In other exemplary embodiments, the distance S is in the range of 0.25 to 2.25 times the diameter of one of the wire electrodes, such as the larger of the two electrodes. In manual or semi-automatic welding operations the distance S can be in the range of 0.25 to 2.25 times the largest electrode diameter, whereas in robotic welding operations the distance S can be in the same or another range, such as 2.5 to 3.5 times the largest electrode diameter. In exemplary embodiments, the distance S is in the range of 0.2 to 3.5 mm.

The wire electrodes E1/E2 project from exit orifices on the end face of the contact tip 200. The diameter of the exit orifices is slightly larger than the diameter of the wire electrodes E1/E2. For example, for a 0.035 inch wire, the diameter of the exit orifice could be 0.043 inches (1.09 mm); for a 0.040 inch wire, the diameter of the exit orifice could be 0.046 inches (1.17 mm); for a 0.045 inch wire, the diameter of the exit orifice could be 0.052 inches (1.32 mm). The channels 201, 203 and exit orifices are spaced appropriately to facilitate the formation of a single bridge droplet between the wire electrodes E1/E2 during a deposition operation. For exit orifices sized for electrodes having a diameter 0.045 inches and smaller, the distance between the exit orifices (inner circumference to inner circumference, similar to distance S) can be less than 3 mm to facilitate the formation of a bridge droplet. However, spacing of 3 mm or greater between the exit orifices may be possible, depending on the wire size, magnetic forces, orientation (e.g., angle) of the channels 201, 203, etc. In certain embodiments, the distance between the exit orifices is within the range of 20% to 200% of the diameter of one or both of the exit orifices, which can also correspond to the distance S between the wire electrodes being in the range of 0.25 to 2.25 times the diameter of the electrodes.

As explained further below, the distance S should be selected to ensure that a single bridge droplet is formed between the electrodes E1/E2, before the droplet is transferred to the molten puddle during a deposition operation, while also preventing the solid portions of the electrodes E1/E2 that are delivered through the channels and exit orifices from contacting each other, other than through the bridge droplet.

Figure 3A:
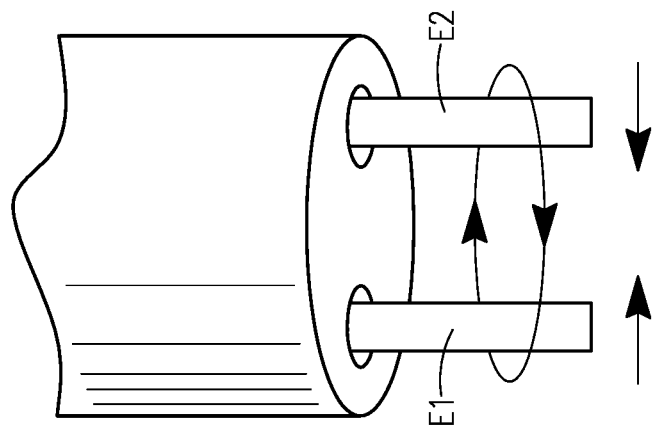
FIGS. 3A to 3D illustrate diagrammatical representations of a welding operation in an exemplary embodiment of the present invention.

FIG. 3A depicts an exemplary embodiment of the present invention, while showing the interactions of the magnetic forces from the respective electrodes E1 and E2. As shown, due to the flow of current, a magnetic field is generated around the electrodes which tends to create a pinch force that draws the wires towards each other. This magnetic force tends to create a droplet bridge between the two electrodes, which will be discussed in more detail below.

Figure 3D:
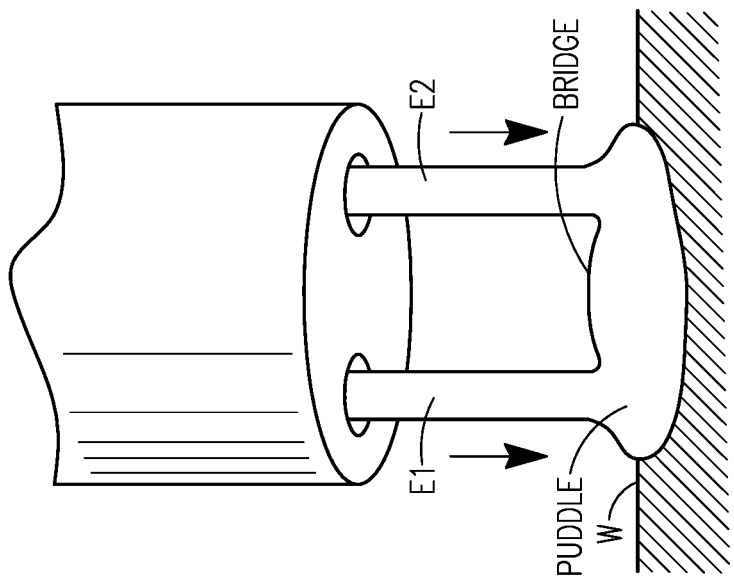
Figure 3C:
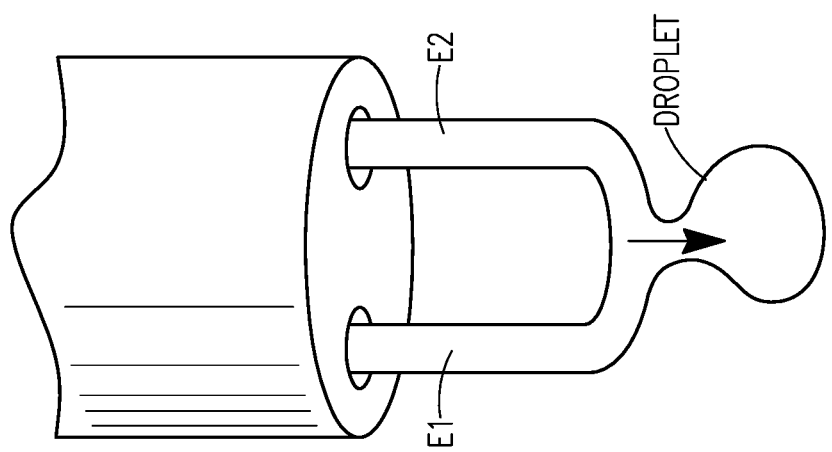
Figure 3B:
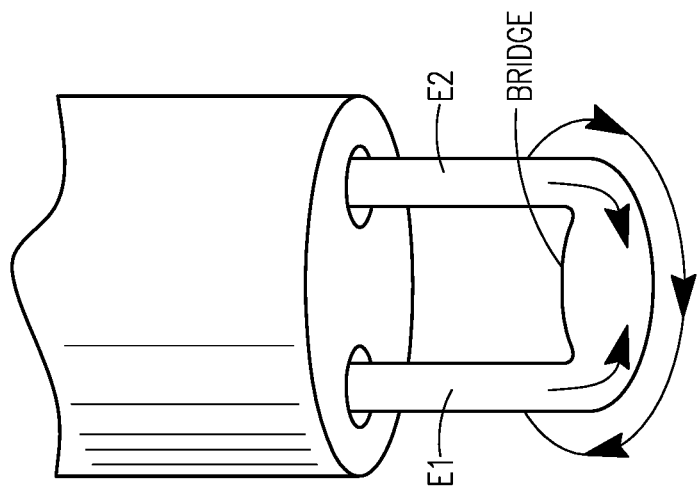

FIG. 3B shows the droplet bridge that is created between the two electrodes E1/E2. That is, as the current passing through each of the electrodes melts the ends of the electrodes the magnetic forces tend to draw the molten droplets towards each other until they connect with each other. The distance S is far enough such that the solid portions of the electrodes are not drawn to contact each other during the deposition operation, but close enough that a droplet bridge is created before the molten droplet is transferred to the weld puddle created by the welding arc. It can be seen in FIG. 3B that a large bridge droplet can form between the electrodes E1/E2; however, there is a relatively small cross sectional area between the droplet and the electrodes. That is, the electrodes contact the bridge droplet along a small cross sectional area of the droplet. The droplet is further depicted in FIG. 3C where the droplet bridge creates a single large droplet that is transferred to the puddle during welding. As show, the magnetic pinch force acting on the droplet bridge acts to pinch off the droplet similar to the use of pinch force in a single electrode welding operation.

In certain embodiments, the bridge droplet is transferred to the molten puddle during a short circuit event between the molten puddle and the wire electrodes E1/E2. This process is known as short arc welding. The short circuit event is depicted in FIG. 3D. The electrodes E1/E2 are driven by the wire feeder toward the workpiece W at a wire feed speed (WFS) that is sufficient to ensure that the bridge droplet does not detach (e.g., pinch off from the electrodes) before the droplet and electrodes short to the molten puddle on the workpiece W. When the force of feeding the electrodes E1/E2 overcomes the heating of the arc and the bridge droplet touches the molten puddle as shown, the large bridge droplet is drawn into the weld pool, and surface tension along with pinch force transfers the droplet from the electrodes to the weld pool. The size of the bridge droplet is significantly larger than the droplets formed in conventional, single electrode short arc welding. This results in a deposit rate per short arc cycle that exceeds conventional short arc welding, yet the cross sectional area between the electrodes and the droplet is relatively small, requiring less pinch force to transfer that droplet. After the bridge droplet shorts to the molten puddle, the electrodes E1/E2 can continue to be driven into the molten puddle for a brief time while being resistive heated by the welding current. Sufficient heat will be present in the molten puddle, in combination with the resistive heating, to melt the electrodes E1/E2 and allow them to be consumed into the weld pool as additional filler metal.

Figure 4B:
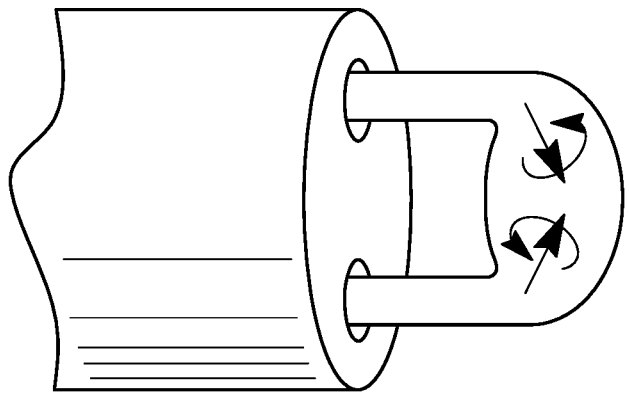
FIGS. 4A to 4B illustrate diagrammatical representations current and magnetic field interactions in exemplary embodiments of the present invention.
Figure 4A:
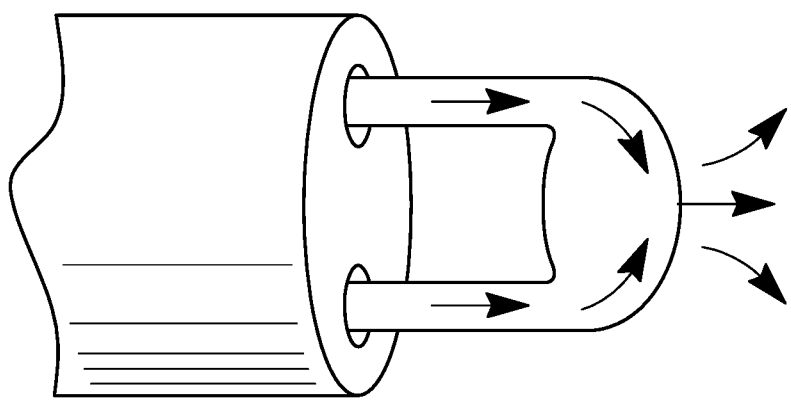

FIG. 4A depicts an exemplary representation of current flow in an embodiment of the present invention. As shown, the welding current is divided so as to flow through each of the respective electrodes and passes to and through the bridge droplet as it is formed. The current then passes from the bridge droplet to the puddle and work piece. In exemplary embodiments where the electrodes are of the same diameter and type the current will be essentially divided evenly through the electrodes. In embodiments where the electrodes have different resistance values, for example due to different diameters and/or compositions/construction, the respective currents will be apportioned due to the relationship of $V=I*R$, as the welding current is applied to the contact tip similar to known methodologies and the contact tip provides the welding current to the respective electrodes via the contact between the electrodes and the channels of the contact tip. FIG. 4B depicts the magnetic forces that aid in creating the bridge droplet. As shown, the magnetic forces tend to pull the respective molten portions of the electrodes towards each other until they contact with each other.

Figure 5A:
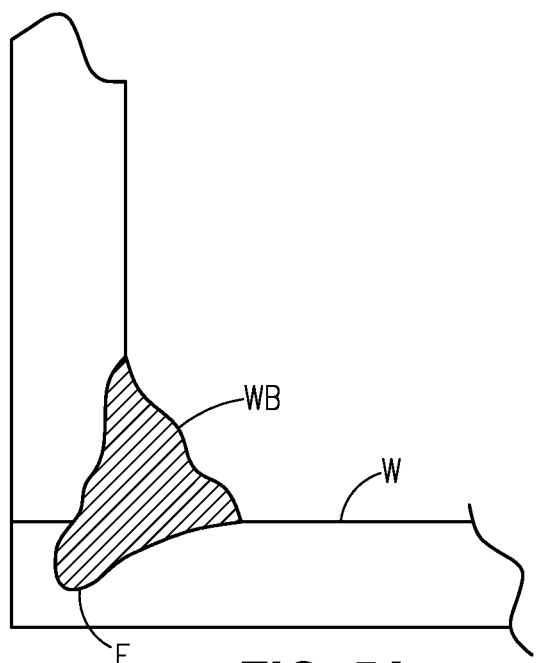
FIG. 5A illustrates a diagrammatical representation of an exemplary weld bead with a single wire and FIG. 5B illustrates a diagrammatical representation of an exemplary weld bead with an embodiment of the invention.
Figure 5B:
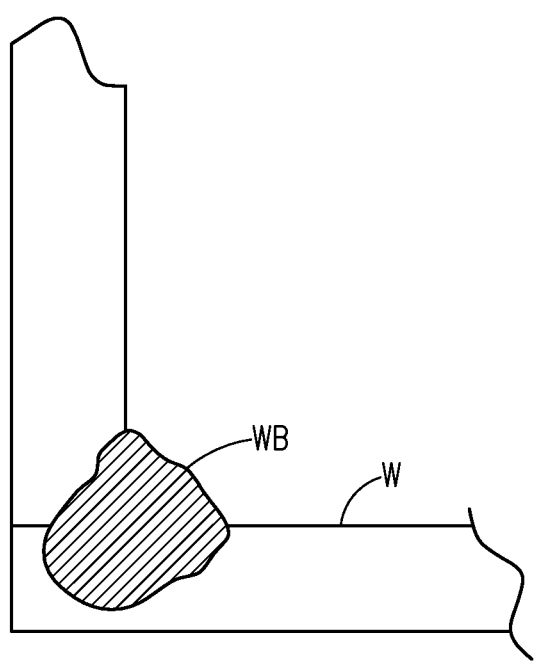

FIG. 5A depicts an exemplary cross-section of a weld made with a single electrode welding operation. As shown, while the weld bead WB is of an appropriate width, the finger F of the weld bead WB, which penetrates into the workpieces W as shown, has a relatively narrow width. This can occur in single wire welding operations when higher deposit rates are used. That is, in such welding operations the finger F can become so narrow that it is not reliable to assume that the finger penetrated in the desired direction, and thus cannot be a reliable indicator of proper weld penetration. Further, as this narrow finger dives deeper this can lead to defects such as porosity trapped near the finger. Additionally, in such welding operations the useful sides of the weld bead are not as deeply penetrated as desired. Thus, in certain applications this mechanical bond is not as strong as desired. Additionally, in some welding applications, such as when welding horizontal fillet welds, the use of a single electrode made it difficult to achieve equal sized weld legs, at high deposition speeds, without the addition of too much heat to the welding operation. These issues are alleviated with embodiments of the present invention which can reduce the penetration of the finger and spread the finger making the side penetration of the weld wider. An example of this is shown in FIG. 5B, which shows a weld bead of an embodiment of the present invention. As shown in this embodiment, a similar, or improved weld bead leg symmetry and/or length can be achieved, as well as a wider weld bead at the weld depth within the weld joint. This improved weld bead geometry is achieved while using less overall heat input into the weld. Therefore, embodiments of the present invention can provide improved mechanical weld performance with lower amounts of heat input, and at improved deposition rates.

Figure 6:
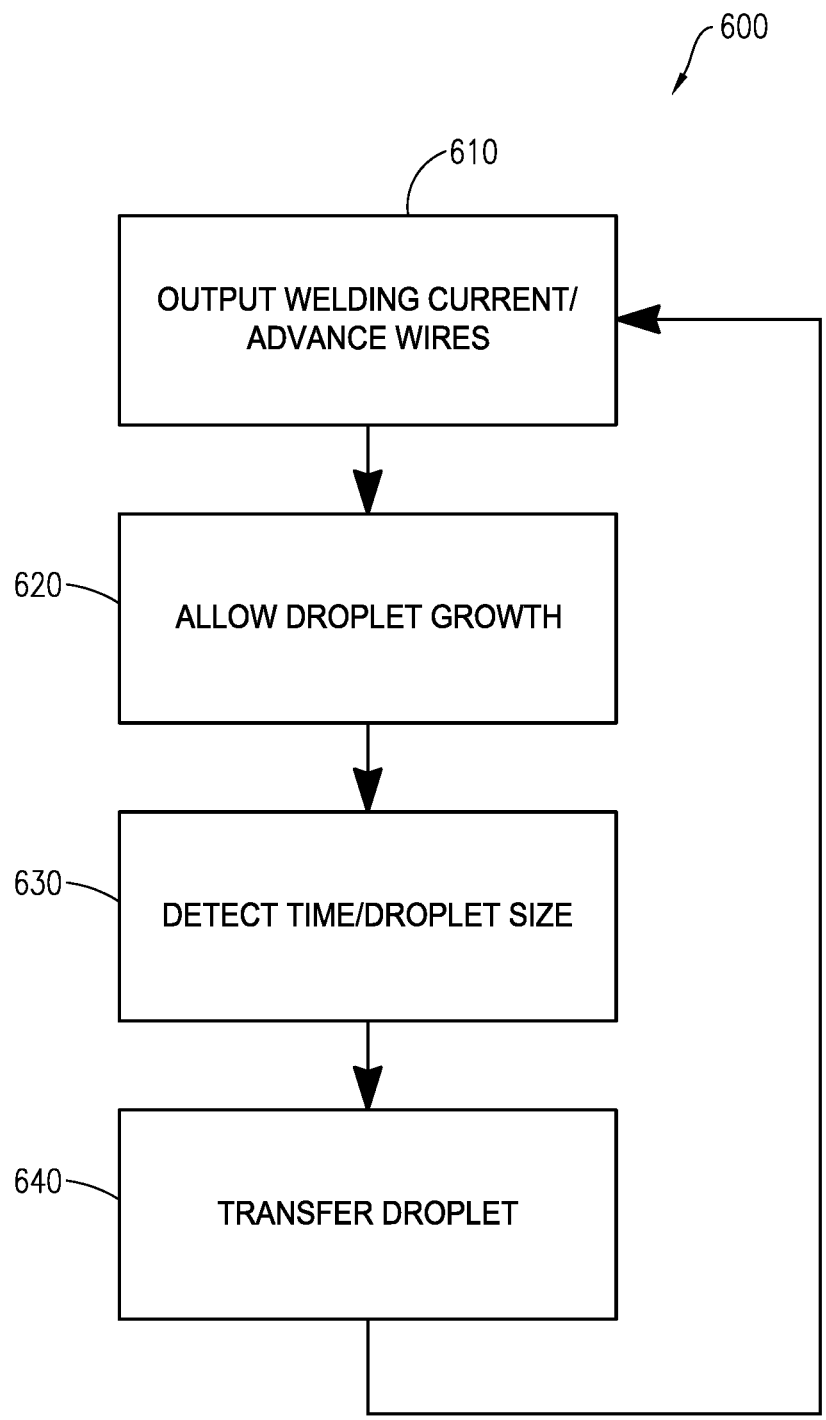
FIG. 6 illustrates a diagrammatical representation of an exemplary weld process flow chart for an embodiment of the present invention.

FIG. 6 depicts a flow chart 600 of an exemplary welding operation of the present invention. This flow chart is intended to be exemplary and is not intended to be limiting. As shown, a welding current/output is provided by the welding power source 610 such that current is directed to the contact tip and electrodes consistent with known system constructions. Exemplary waveforms are discussed further below. During welding a bridge droplet is allowed to form 620 between the electrodes where the respective droplets from each electrode contact each other to create a bridge droplet. The bridge droplet is formed prior to contacting the weld puddle. During formation of the bridge droplet at least one of a duration or a droplet size is detected 630 until such time as the droplet reaches a size to be transferred, and then the droplet is transferred to the puddle 640. The process is repeated during the welding operation. To control the welding process the power source controller/control system can use either one of a bridge droplet current duration and/or a bridge droplet size detection to determine if the bridge droplet is of a size to be transferred. For example, in one embodiment a predetermined bridge current duration is used for a given welding operation such that a bridge current is maintained for that duration, after which droplet transfer is then initiated. In a further exemplary embodiment, the controller of the power source/supply can monitor the welding current and/or voltage and utilize a predetermined threshold (for example a voltage threshold) for a given welding operation. For example, in such embodiments, as the detected arc voltage (detected via a known type of arc voltage detection circuit) detects that the arc voltage has reached a bridge droplet threshold level the power supply initiates a droplet separation portion of the welding waveform. This will be discussed further below in some exemplary embodiments of welding waveforms that can be used with embodiments of the present invention.

Figure 7:
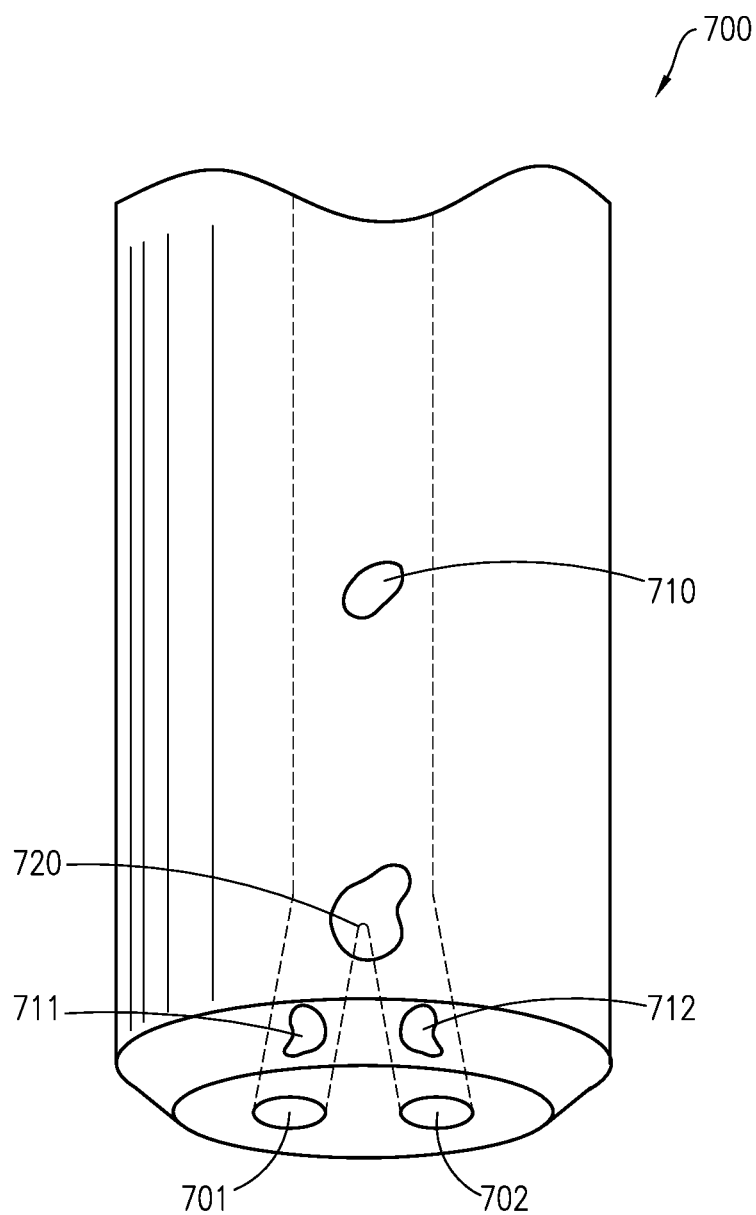
FIG. 7 illustrates a diagrammatical representation of an alternative embodiment of a contact tip assembly for use with embodiments of the present invention.

FIG. 7 depicts an alternative exemplary embodiment of a contact tip 700 that can be used with embodiments of the present invention. As described previously, in some embodiments the electrodes can be directed to the torch via a single wire guide/liner. Of course, in other embodiments, separate wire guide/liners can be used. However, in those embodiments, where a single wire guide/liner is used the contact tip can be designed such that the electrodes are separated from each other within the contact tip. As shown in FIG. 7, this exemplary contact tip 700 has a single entrance channel 710 with a single orifice at the upstream end of the contact tip 700. Each of the electrodes enter the contact tip via this orifice and pass along the channel 710 until they reach a separation portion 720 of the contact tip, where the separation portion directs one electrode into a first exit channel 711 and a second electrode into the second exit channel 712, so that the electrodes are directed to their discrete exit orifices 701 and 702, respectively. Of course, the channels 710, 711 and 712 should be sized appropriately for the size of electrodes to be used, and the separation portion 720 should be shaped so as to not scar or scratch the electrodes. As shown in FIG. 7, the exit channels 711 and 712 are angled relative to each other, however, as shown in FIG. 2, these channels can also be oriented parallel to each other.

Figure 8:
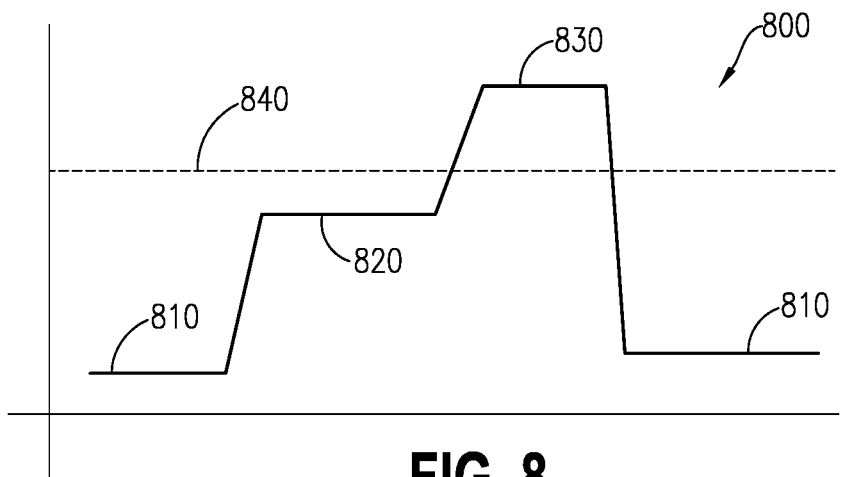
FIG. 8 illustrates a diagrammatical representation of an exemplary weld current waveform for embodiments of the present invention.
Figure 9:
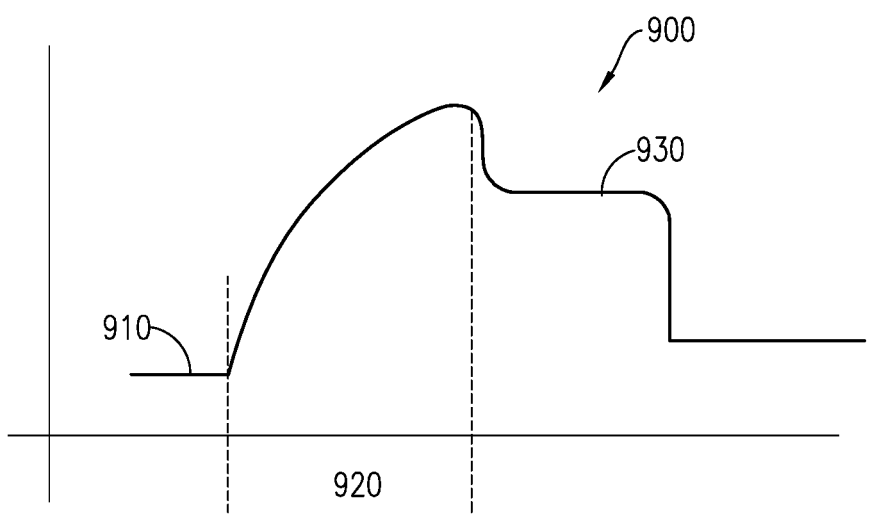
FIG. 9 illustrates a diagrammatical representation of a further exemplary weld current waveform for embodiments of the present invention.
Figure 10:
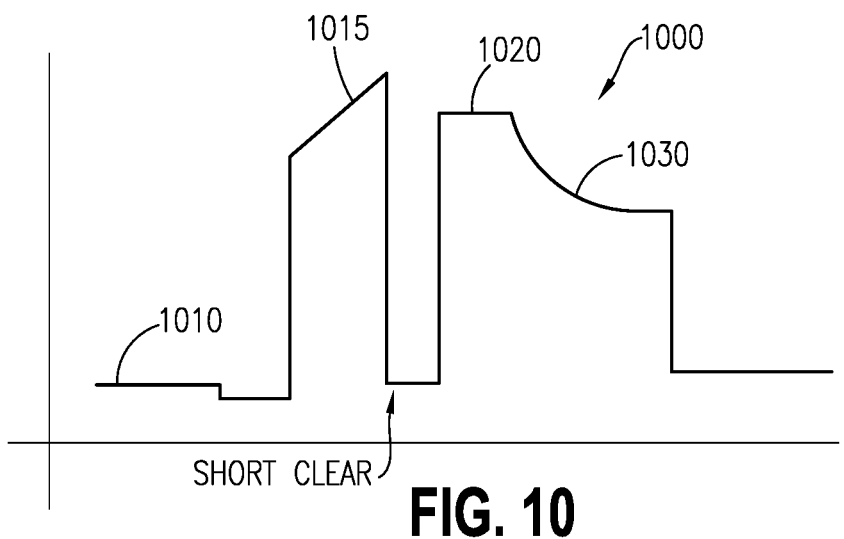
FIG. 10 illustrates a diagrammatical representation of an additional exemplary weld current waveform for embodiments of the present invention.

Turning now to FIGS. 8 through 10, various exemplary waveforms that can be used with exemplary embodiments of the present invention are depicted. In general, in exemplary embodiments of the present invention, the current is increased to create the bridge droplet and build it for transfer. In exemplary embodiments, at transfer the bridge droplet has an average diameter which is similar to the distance S between the electrodes, which can be larger than the diameter of either of the electrodes. When the droplet is formed it is transferred via a high peak current, after which the current drops to a lower (e.g. background) level to remove the arc pressure acting on the wires. The bridging current then builds the bridge droplet without exerting too much pinch force to pinch off the developing droplet. In exemplary embodiments, this bridging current is at a level in the range of 30 to 70% between the background current and the peak current. In other exemplary embodiments, the bridging current is in the range of 40 to 60% between the background current and the peak current. For example, if the background current is 100 amps and the peak current is 400 amps, the bridging current is in the range of 220 to 280 amps (i.e., 40 to 60% of the 300 amp difference). In some embodiments the bridging current can be maintained for a duration in the range of 1.5 to 8 ms, while in other exemplary embodiments the bridging current is maintained for a duration in the range of 2 to 6 ms. In exemplary embodiments the bridging current duration begins at the end of the background current state and includes the bridging current ramp up, where the ramp up can be in the range of 0.33 to 0.67 ms depending on the bridging current level and the ramp rate. With exemplary embodiments of the present invention, the pulse frequency of waveforms can be slowed down as compared to single wire processes to allow for droplet growth which can improve control and allow for higher deposition rates as compared to single wire operations.

FIG. 8 depicts an exemplary current waveform 800 for a pulsed spray welding type operation. As shown, the waveform 800 has a background current level 810, which then transitions to a bridge current level 820, during which the bridge droplet is grown to a size to be transferred. The bridge current level is less than a spray transition current level 840 at which the droplet starts its transfer to the puddle. At the conclusion of the bridge current 820 the current is raised to beyond the spray transition current level 840 to a peak current level 830. The peak current level is then maintained for a peak duration to allow for the transfer of the droplet to be completed. After transfer the current is then lowered to the background level again, as the process is repeated. Thus, in these embodiments the transfer of the single droplet does not occur during the bridge current portion of the waveform. In such exemplary embodiments, the lower current level for the bridge current 820 allows a droplet to form without excessive pinching force to direct the droplet to the puddle. Because of the use of the bridge droplet, welding operations can be attained where the peak current 830 can be maintained for a longer duration at a higher level than using a single wire. For example, some embodiments can maintain the peak duration for at least 4 ms, and in the range of 4 to 7 ms, at a peak current level in the range of 550 to 700 amps, and a background current in the range of 150 to 400 amps. In such embodiments, a significantly improved deposition rate can be achieved. For example, some embodiments have achieved deposition rates in the range of 19 to 26 lbs/hr, whereas similar single wire processes can only achieve a deposition rate in the range of 10 to 16 lbs/hr. For example, in one non-limiting embodiment a pair of twin wires having a diameter of 0.040", using a peak current of 700 amps, a background current of 180 amps and a droplet bridge current of 340 amps can be deposited at a rate of 19 lb/hr at a frequency of 120 Hz. Such a deposition is at a frequency much less than conventional welding processes, and thus more stable.

FIG. 9 depicts another exemplary waveform 900 that can be used in a short arc type welding operation. Again, the waveform 900 has a background portion 910 prior to a short response portion 920 which is structured to clear a short between the droplet and the puddle. During the shorting response 920 the current is raised to clear the short and as the short is cleared the current is dropped to a bridge current level 930 during which the bridge droplet is formed. Again, the bridge current level 930 is less than the peak current level of the shorting response 920. The bridge current level 930 is maintained for a bridge current duration that allows a bridge droplet to be formed and directed to the puddle. During transfer of the droplet current is then dropped to the background level, which allows the droplet to advance until a short occurs. When a short occurs the shorting response/bridge current waveform is repeated. It should be noted that in embodiments of the present invention it is the presence of the bridge droplet that makes the welding process more stable. That is, in traditional welding processes that use multiple wires there is no bridge droplet. In those processes when one wire shorts or makes contact with the puddle the arc voltage drops and the arc for the other electrode will go out. This does not occur with embodiments of the present invention, where the bridge droplet is common to each of the wires.

FIG. 10 depicts a further exemplary waveform 1000, which is a STT (surface tension transfer) type waveform. Because such waveforms are known, they will not be described in detail herein. To further explain an STT type waveform, its structure, use and implementation, US. Publication No. 2013/0264323, filed on Apr. 5, 2012, is incorporated herein in its entirety. Again, this waveform has a background level 1010, and a first peak level 1015 and a second peak level 1020, where the second peak level is reached after a short between the droplet and puddle is cleared. After the second peak current level 1020, the current is dropped to a bridge current level 1030 where the bridge droplet is formed, after which the current is dropped to the background level 1010 to allow the droplet to be advanced to the puddle, until it makes contact with the puddle. In other embodiments, an AC waveform can be used, for example an AC STT waveform, pulse waveform, etc. can be used.

The waveforms of FIGS. 9 and 10 are example waveforms for short circuit or short arc welding using a bridge droplet. During arcing portions of these deposition operations, the WFS of the welding electrodes is positive and relative high to push the bridge droplet into the molten puddle before it detaches from the electrodes. However, during the short circuit event, the WFS can be reduced to allow a pinch force from the current flow to separate the electrodes from the molten puddle and reestablish arcs from the electrodes. In certain embodiments, wire feeding can be stopped during the short circuit event so that the WFS reaches zero. The feeding direction of the wire feeder can also be reversed during the short circuit event, to pull the electrodes out of the molten puddle. In that case, the wire feeder initially drives the electrodes into the molten puddle during the short circuit event to add additional filler metal to the puddle, and then subsequently pulls the electrodes away from the molten puddle to help reestablish the arcs. The timing for slowing, stopping, and/or reversing the electrodes can be based on the detected occurrence of the short circuit event. For example, the power source can monitor the welding voltage and control the wire feeder to slow/stop/reverse the electrodes when the welding voltage drops to a short circuit level, or slow/stop/reverse the electrodes at a predetermined duration of time after the short circuit occurs. The welding arcs between the electrodes and the molten puddle can be reestablished while the wire feeding is slowed or stopped or the feeding direction is reversed (away from the molten puddle). The wire feeder can then resume delivering the electrodes toward the molten puddle after the short clears and the arcs are reestablished. Changes to the WFS and direction can be coordinated with changes to the current level during the short circuit and arcing portions of the deposition operation.

As discussed above, the wire electrodes used in a multi-wire deposition operation (e.g., welding, additive manufacturing, hardfacing, etc.) can be spaced by a distance S that facilitates formation of a bridge droplet between the wire electrodes. The size of the bridge droplet is determined by the spacing between the wire electrodes and the spacing between the exit orifices in the contact tip. The size of the bridge droplet determines the width of the electric arc that exists during the deposition operation, and reducing the spacing between the exit orifices and wire electrodes narrows the arc width. Larger bridge droplets may be preferred for larger welds, and smaller bridge droplets preferred for smaller welds. Deposition rate is impacted by the arc width, and the deposition rate for small gauge wires can be increased by reducing the spacing between the exit orifices and wire electrodes (e.g., from approximately 2 mm to 1 mm).

The maximum spacing between the exit orifices and between the wire electrodes is reached when the magnetic forces developed by the current waveform (e.g., at the peak current level) still allow formation of the bridge droplet, and is exceeded when bridging is no longer possible. The minimum spacing is that which keeps the solid portions of the wires separated at the point of bridging. The magnetic forces tend to pull the wire electrodes together, and the wires are somewhat flexible. Thus, the minimum spacing between the exit orifices and between the wire electrodes will depend on the stiffness of the electrodes, which is impacted by parameters such as wire diameter, material of construction, etc.

Figure 11:
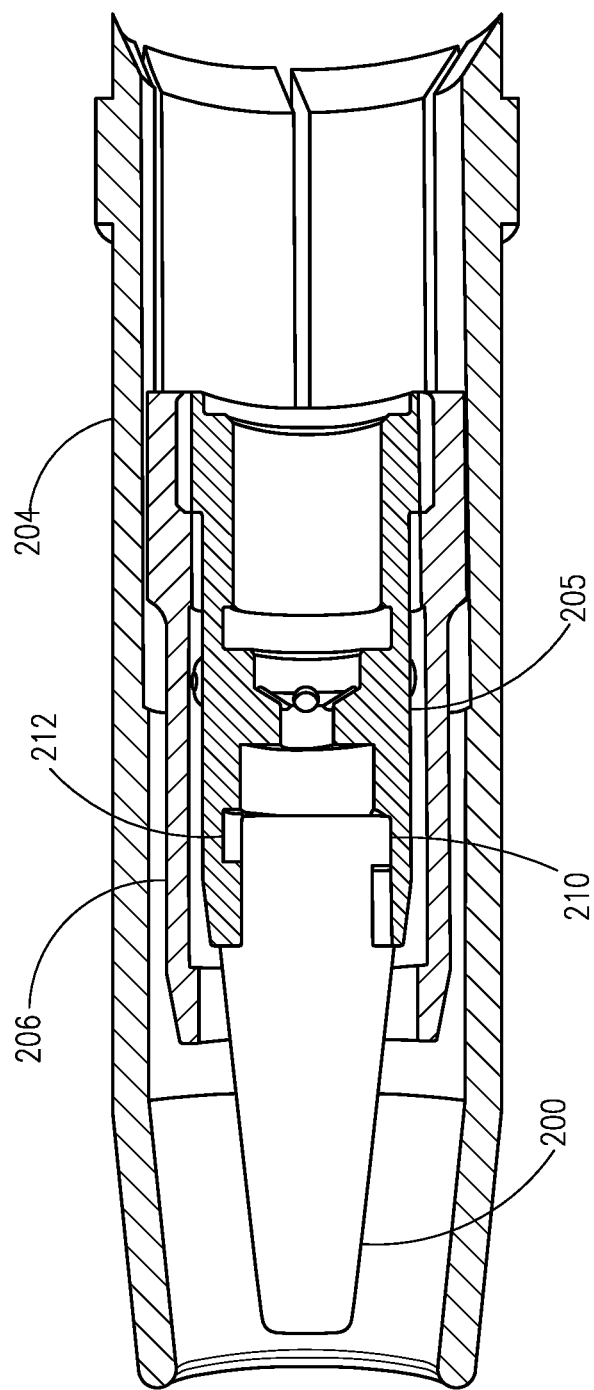
FIG. 11 shows a portion of a welding torch.
Figure 12:
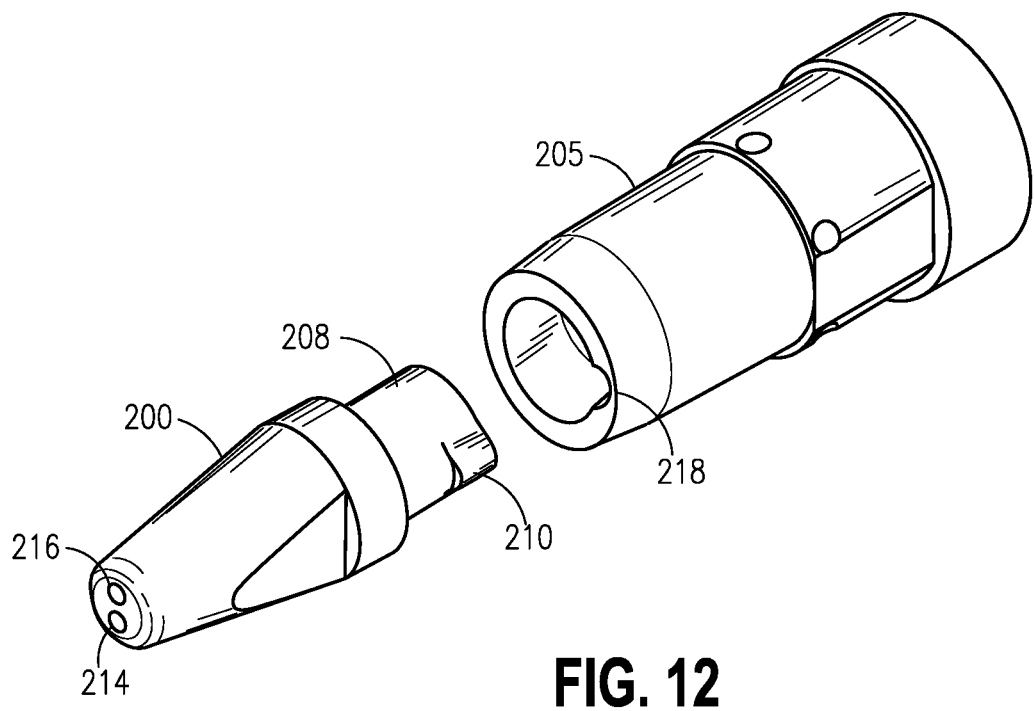
FIG. 12 is a perspective view of a contact tip and diffuser.
Figure 13:
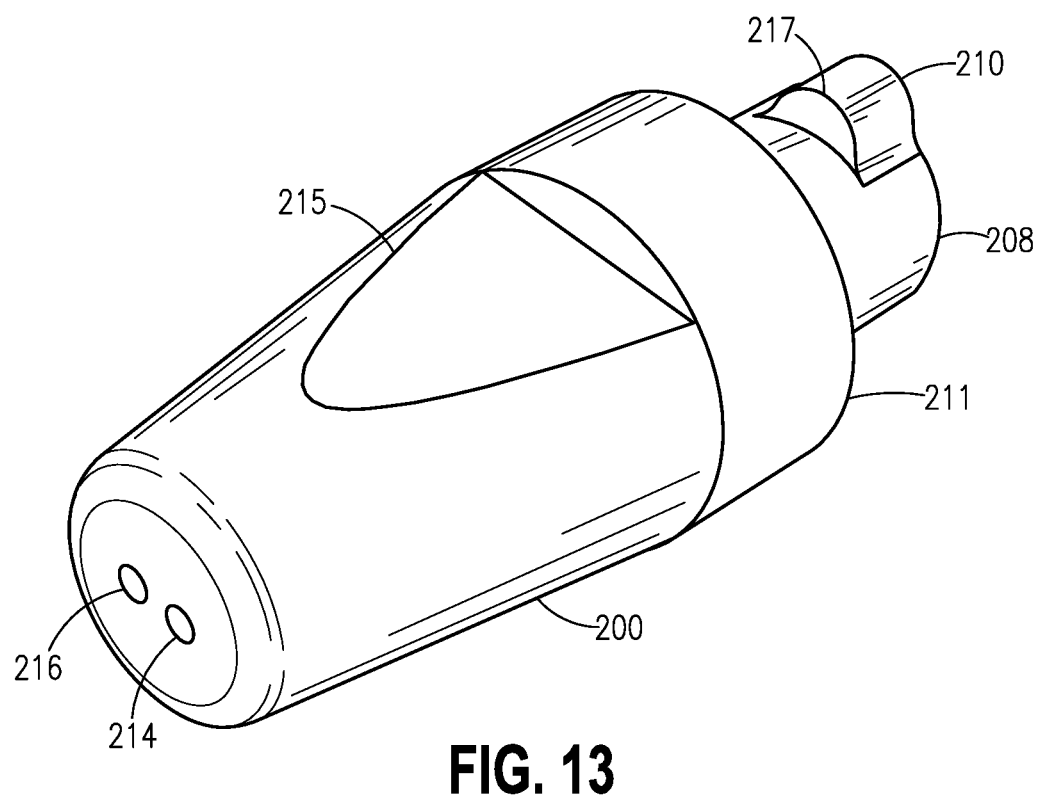
FIG. 13 is a perspective view of a contact tip.
Figure 14:
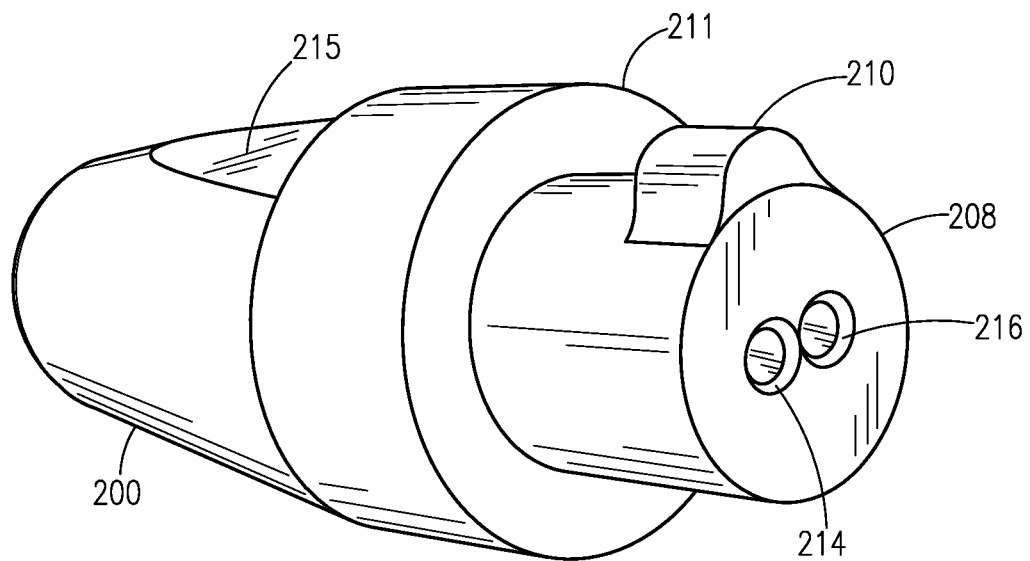
FIG. 14 is a perspective view of a contact tip.
Figure 15:
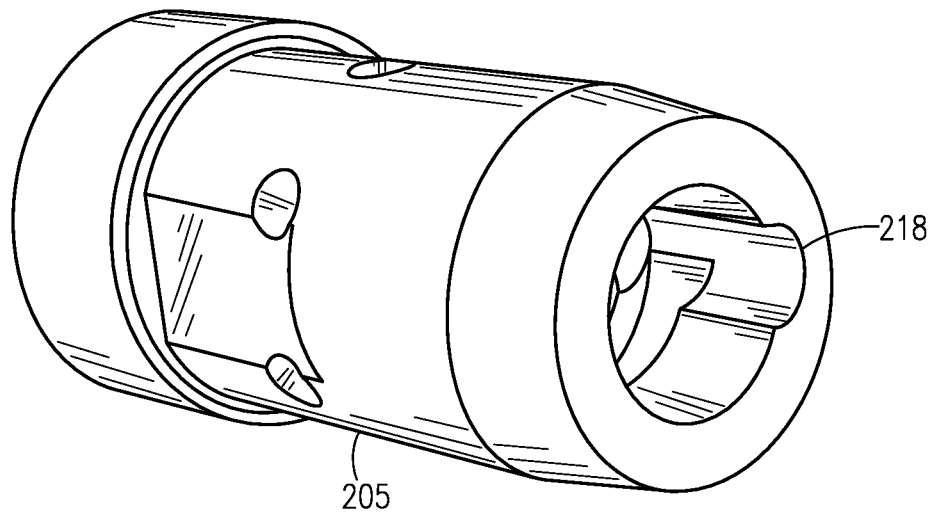
FIG. 15 is a perspective view of a diffuser.
Figure 16:
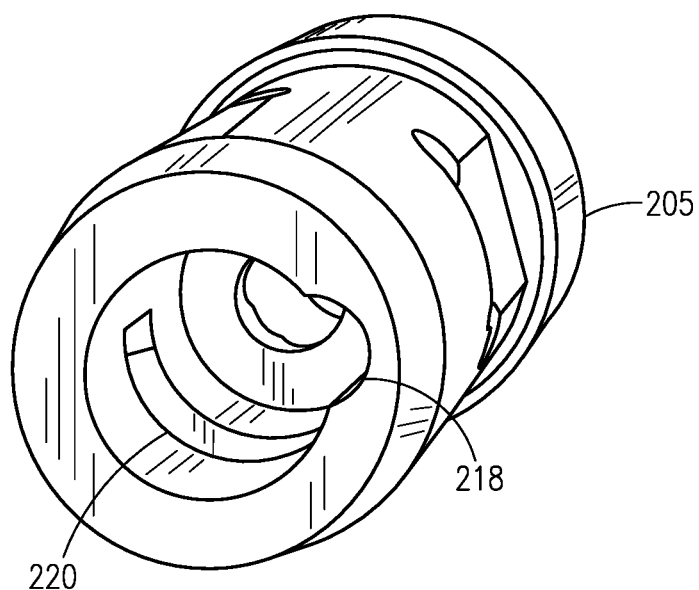
FIG. 16 is a perspective view of a diffuser.

FIG. 11 depicts an end portion of an exemplary welding torch in accordance with the present invention. Because the construction and operation of welding torches is generally known, the details of such construction and operation will not be discussed in detail herein. As shown, the torch includes a number of components and is used to deliver at least two wire electrodes and a shielding gas to a workpiece for a welding or additive manufacturing operation. The torch includes a diffuser 205 which aids in properly directing and distributing the shielding gas for a welding operation. Coupled to the downstream end of the diffuser 205 is a contact tip 200, which is used to pass the welding current into the at least two wire electrodes which are passing though the contact tip simultaneously during welding. The contact tip 200 is configured to facilitate the formation of a bridge droplet between the wire electrodes that are delivered through bores or channels in the contact tip. The bridge droplet couples the first wire electrode to the second wire electrode prior to contacting a molten puddle created by the deposition operation, as discussed above.

Threaded onto the outside of the diffuser 205 is an insulator 206. The insulator 206 electrically isolates a nozzle 204 from the electrically live components within the torch. The nozzle 204 directs the shielding gas from the diffuser 205 to the distal end of the torch and the workpiece during welding.

Conventional contact tips have threads on an upstream or proximal end of the contact tip that thread into the diffuser. The contact tip and diffuser are connected by screwing the contact tip into the diffuser. Such a fastening system works well for welding with single wires. The welding wire can be threaded through the contact tip and the contact tip can be rotated around the wire multiple times and screwed into the diffuser. However, when welding with multiple welding wires simultaneously passing through the contact tip, such a fastening system would result in an undesirable twisting of the welding wires. For example, if two welding wires are passed through the contact tip, subsequently threading the contact tip onto the diffuser by multiple turns requiring greater than 360° of rotation will result in the welding wires becoming twisted and unable to be fed through the contact tip.

The contact tip 200 in FIG. 11 is attached to the diffuser 205 by rotation of the contact tip through less than 360°, such as 270° (three-quarter turn), 180° (one-half turn), 90° (quarter turn), less than 90°, etc. The rotation of the contact tip 200 necessary to attach the contact tip to the diffuser 205 can be any angle as desired that is preferably less than 360° and results in the multiple wire electrodes passing through the contact tip not becoming unduly twisted during installation of the contact tip. If the welding wires are unduly twisted during installation of the contact tip, wire feeding problems will result and "bird nesting" of the welding wires can occur.

With reference to FIGS. 11-16, the contact tip 200 is attached to the diffuser 205 by a quarter turn, clockwise rotation of the contact tip within the diffuser. The contact tip 200 has a forward or downstream distal portion that has a tapered shape and includes flats 215 to accommodate gripping by a tool, such as pliers. The contact tip 200 has a rearward or upstream proximal portion 208 that is generally cylindrical, but includes a radially-projecting tab 210 that engages a slot 212 in an interior wall of the diffuser 205, to securely connect the contact tip to the diffuser. The rearward portion 208 of the contact tip 200 is located within the diffuser 205 when the contact tip is installed onto the diffuser, and acts as a mounting shank for the contact tip. It can be seen that the diameter of the rearward portion 208 of the contact tip is smaller than the adjacent downstream portion, which results in a shoulder 211 projecting radially from the cylindrical rearward portion 208 of the contact tip. The shoulder 211 seats against the terminal end face of the diffuser 205 when the contact tip 200 is installed onto the diffuser.

The contact tip 200 can be made from known contact tip materials and can be used in any known type of welding gun. The contact tip can comprise an electrically-conductive body, such as copper, extending from its rearward, proximal end to its forward, distal end. As shown in this exemplary embodiment, the contact tip 200 has two separate wire channels or bores 214 and 216 which run the length of the contact tip. The channels 214/216 can extend between wire entrance orifices on the proximal end face of the mounting shank 208, and wire exit orifices on the distal end face of the contact tip. During welding, a first wire electrode is delivered through the first channel 214 and a second wire electrode is delivered through the second channel 216. The channels 214/216 are typically sized appropriately for the diameter of wire that is to be fed through the channel. For example, if the electrodes are to have the same diameter, then the channels will have the same diameters. However, if different wire sizes are to be used together, then the channels should be sized appropriately so as to properly transfer current to the differently-sized electrodes. Additionally, in the embodiment shown, the channels 214/216 are configured such that the electrodes exit the distal end face of the contact tip 200 in a parallel relationship. However, in other exemplary embodiments the channels can be configured so that the electrodes exit the distal end face of the contact tip such that an angle in the range of +1-15° exists between the centerlines of the respective electrodes. The angling can be determined based on the desired performance characteristics of the welding operation. The example contact tips discussed herein are shown having two electrode bores. However, it is to be appreciated that the contact tips could have bores for more than two electrodes, such as three or more bores.

The slot 212 in the interior wall of the diffuser 205 includes an axial portion 218 and a helical portion 220. The axial portion 218 of the slot 212 extends to the downstream terminal end face of the diffuser 205, against which the shoulder 211 of the contact tip 200 seats. After the welding electrodes are fed through the contact tip 200, the radially-projecting tab 210 on the mounting shank 208 is inserted into the axial portion 218 of the 212 slot and the contact tip is pushed into the diffuser 205. When the tab 210 reaches the helical portion 220 of the slot, the contact tip 200 is rotated to move the tab to the end of the helical portion. The helical portion 220 has a slight upstream pitch that draws the contact tip 200 inward as the contact tip is rotated, so that the shoulder 211 of the contact tip seats against the downstream terminal end face of the diffuser 205. The tab 210 on the mounting shank 208 can have a tapered edge 217 that matches the pitch of the slot 212 in the diffuser 205, to help ensure a tight connection between the two components. In the example embodiment shown, the helical portion 220 of the slot 212 allows for a quarter turn of the contact tip 200 to secure the contact tip to the diffuser 205. However, it is to be appreciated that other rotational angles are possible (e.g., more or less than a quarter turn or 90°). For example, the helical portion 220 of the slot can extend less than 360° around the inner circumference of the interior chamber of the diffuser 205.

Figure 17:
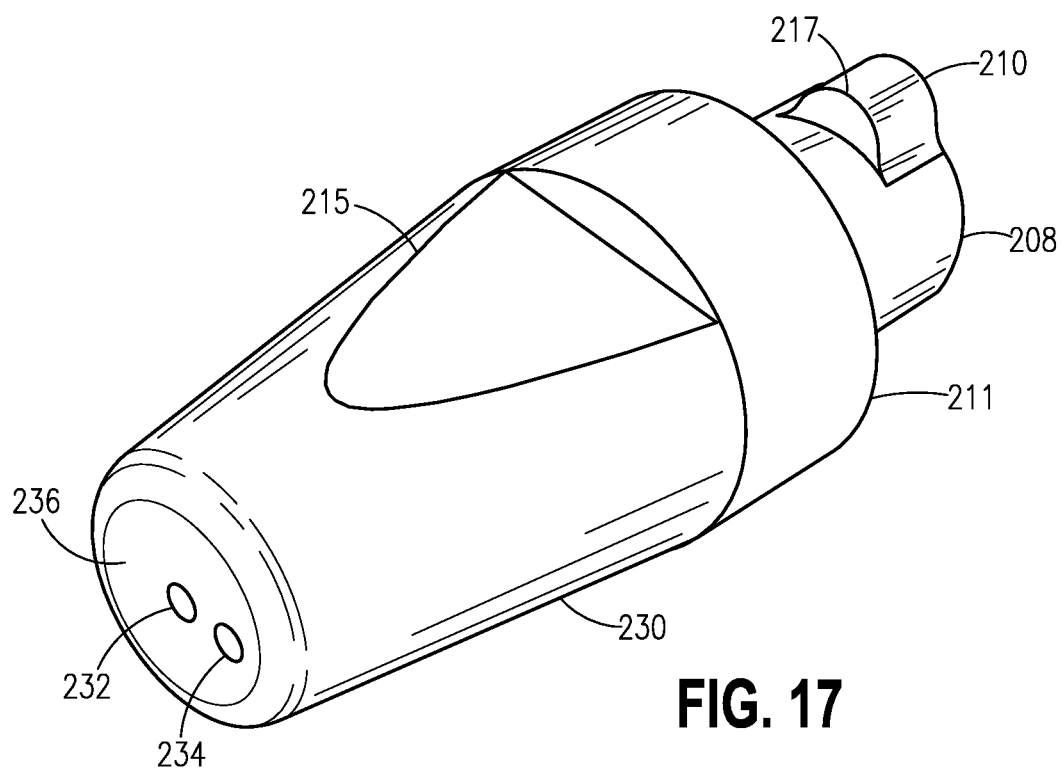
FIG. 17 is a perspective view of a further example contact tip.

FIG. 17 illustrates a further example contact tip 230. The contact tip 230 is similar to the contact tip shown in FIG. 13. However, the wire exit orifices 232, 234 are not symmetrically arranged on the distal end face 236 of the contact tip 230. Exit orifice 232 is substantially centered along the distal end face 236 of the contact tip 230. The second exit orifice 234 is separated from the first exit orifice 232 by a distance configured to facilitate formation of a bridge droplet between wire electrodes delivered through the contact tip 230 as discussed above. The wire electrode delivered through the first exit orifice 232, which is centered along the axis of the torch, can be used for touching sensing the weld path and through arc seam tracking (TAST). The wire electrode delivered through the first exit orifice 232 can also be the primary electrode used when the welding system is configured for both single wire and dual wire operation. In single wire operation, a wire feeder delivers a wire electrode through only the first exit orifice 232 for use during welding, while in dual wire operation, the same wire feeder or a second wire feeder delivers wire electrodes through both of the exit orifices 232, 234. During single wire operation, if the primary wire electrode runs out, the secondary wire electrode delivered through the second exit orifice 234 can be used as a backup until the primary wire electrode is replenished.

Figure 18:
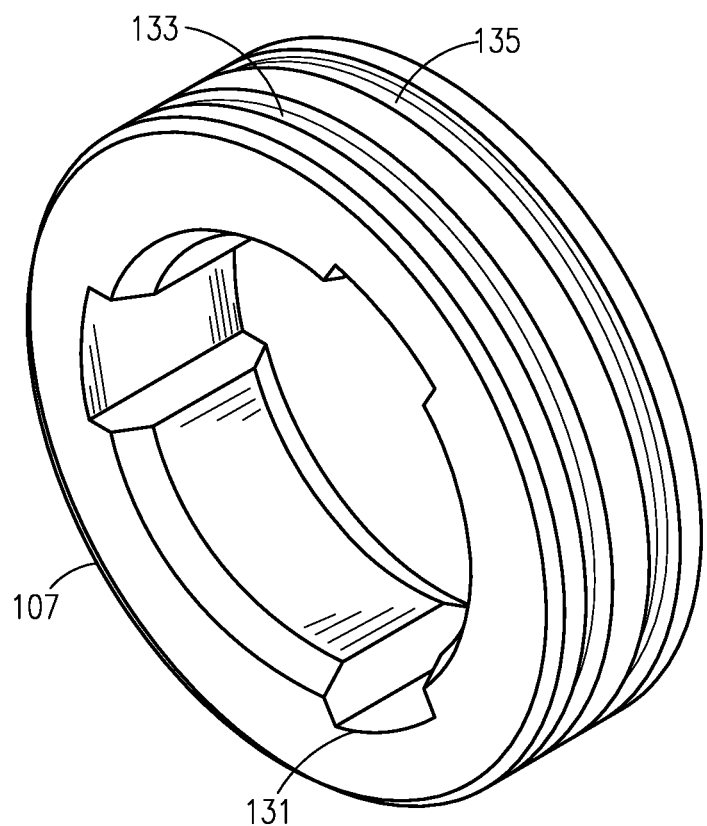
FIG. 18 is a perspective view of the example drive roll.

FIG. 18 illustrates an example drive roll 107 for use in a wire feeder in a dual wire welding system. The drive roll 107 has a central bore. The inner surface of the bore can include contoured recesses 131 for receiving projections on a driving mechanism, such as a drive gear, to transfer drive torque to the drive roll 107. The drive roll 107 includes one or more annular or circumferential wire receiving grooves 133, 135. The wire receiving grooves 133, 135 are spaced axially along the circumference of the drive roll 107. The wire receiving grooves 133, 135 are designed to receive two welding wires. Example standard welding wire diameters for use with the drive rolls 107 include 0.030 inches, 0.035 inches, 0.040 inches, 0.045 inches, etc. The wire receiving grooves 133, 135 can have the same width and depth as each other, or have different widths and depths to accommodate different sizes or combinations of dual welding wires. If the wire receiving grooves 133, 135 each have the same width and depth, then the drive roll 107 can be reused when one groove is worn out by simply flipping the drive roll over and reinstalling it on the wire feeder. The wire receiving grooves 133, 135 can be configured to simultaneously drive two wires having the same diameter, or two wires having different diameters. The wire receiving grooves 133, 135 can have a generally trapezoidal shape with straight, angled or inwardly-tapered sidewalls and a flat base extending between the sidewalls. However, the wire receiving grooves 133, 135 could have other shapes besides a trapezoidal shape, such as having a curved, concave groove base for example. In certain embodiments, the grooves 133, 135 can include knurling or other frictional surface treatments to help grip the welding wires.

Figure 19:
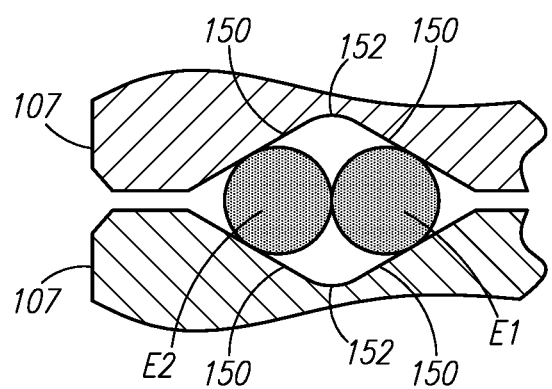
FIG. 19 illustrates a cross section of drives rolls feeding dual wires.

FIG. 19 shows a partial cross section of two drive rolls 107 as they would be mounted on a wire feeder for supplying dual welding wires during a deposition operation. The drive rolls 107 are biased together to provide a clamping force on the first E1 and the second E2 welding wires. The welding wires E1, E2 are both located in the annular grooves of the upper and lower drive rolls 107. Due to the bias force applied to the drive rolls 107, the welding wires E1, E2 are clamped in the annular grooves between upper and lower sidewalls 150 forming the grooves and the neighboring welding wire. The welding wires E1, E2 are stably held via three points of contact within the annular grooves. This clamping system can allow both wires to be fed through the wire feeder in a consistent manner. The two welding wires E1, E2 support each other during feeding and pull each other along via friction. Because the sidewalls 150 of the annular grooves are angled, they apply both vertical and horizontal clamping forces on the welding wires E1, E2. The horizontal clamping force pushes the welding wires E1, E2 together, causing them to contact each other. The welding wires E1, E2 are clamped within the annular grooves so as to be radially offset from both concave groove bases 152. That is, the welding wires E1, E2 are pinned between each other and the angled sidewalls 150 of the grooves such that gaps exist between each of the welding wires and the groove bases 152. In an example embodiment, the angle between the sidewalls 150 and the outer circumference of the drive roll 107 is about 150°, although other angles are possible and can be determined with sound engineering judgment.

The wire clamping provided by the drive rolls 107 allows for some variability (e.g., due to manufacturing tolerances) in the diameters of the welding wires E1, E2. If each welding wire E1, E2 had its own dedicated annular groove in the drive rolls 107, and one of the welding wires was slightly larger than the other, then the smaller welding wire might not be adequately clamped between the drive rolls. In such a situation, the larger welding wire would limit the radial displacement of the drive rolls 107 toward each other, thereby preventing proper clamping of the smaller wire. This could lead to feeding problems and so-called birdnesting of the smaller welding wire during feeding. The clamping system discussed above can accommodate wires of different sizes because the clamping system is self-adjusting. When one welding wire E1 is larger than the other E2, the contact point between the wires is shifted axially from a central position within the annular grooves toward the smaller wire. Three points of contact are maintained on each welding wire E1, E2 by the sidewalls 150 of the groove and the neighboring welding wire.

Figure 20:
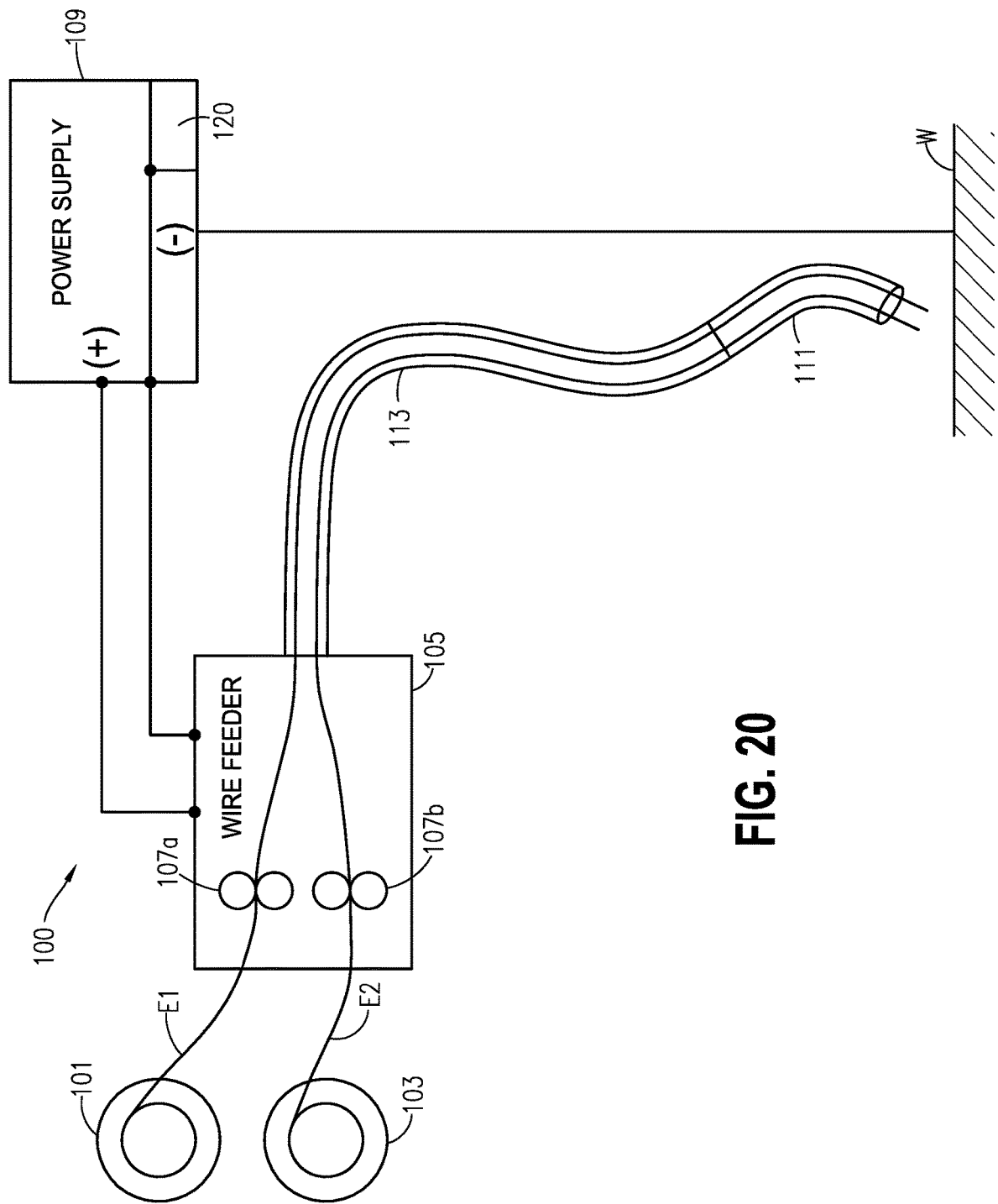
FIG. 20 illustrates a diagrammatical representation of an exemplary embodiment of a welding system of the present invention.
Figure 21:
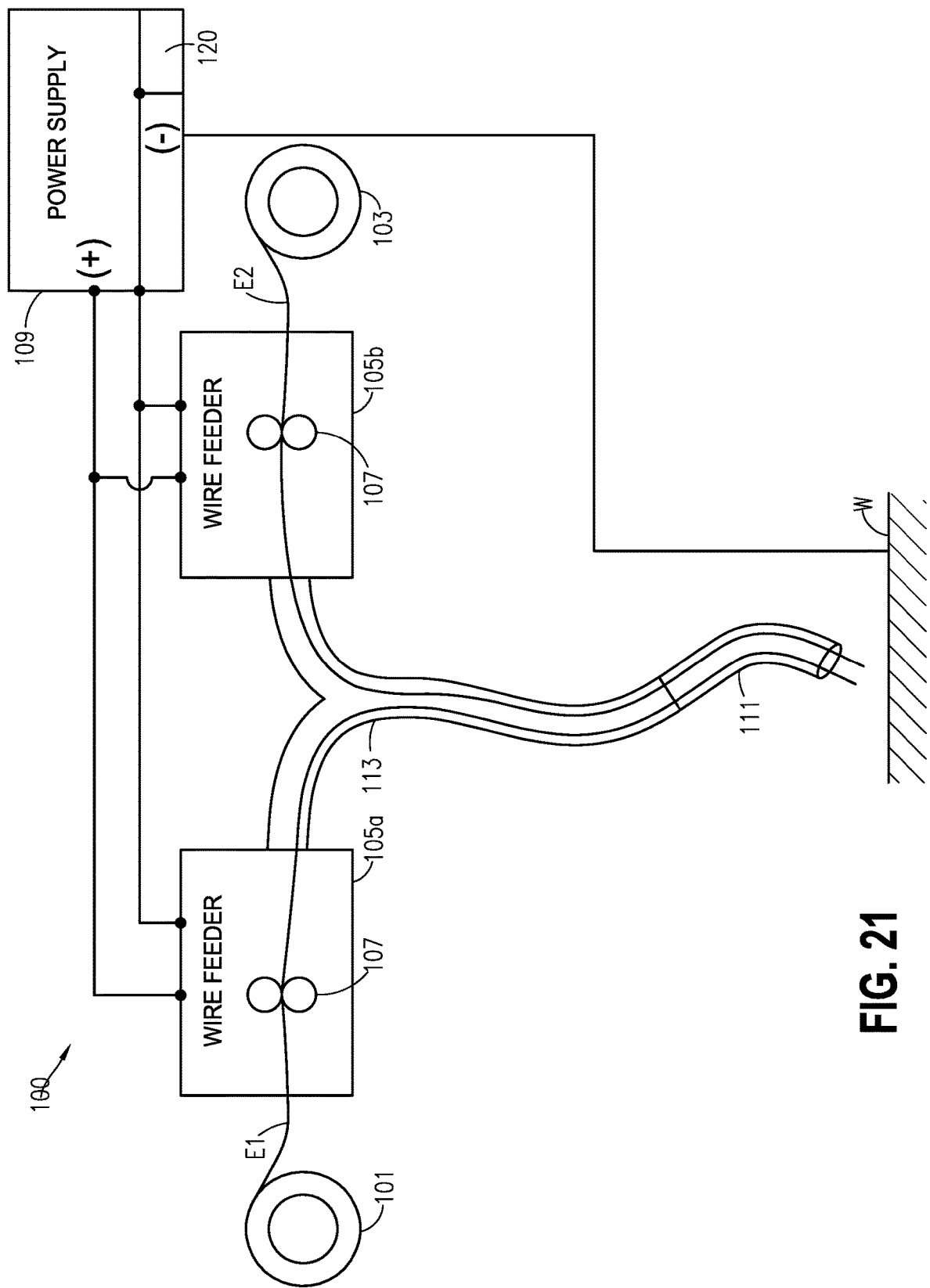
FIG. 21 illustrates a diagrammatical representation of an exemplary embodiment of a welding system of the present invention.

FIG. 20 depicts a further example embodiment of the welding system 100 in which the wire feeder 105 has separate sets of drive rolls 107a, 107b for feeding the electrodes E1, E2 respectively. The wire feeder 105 can selectively drive either one or both of the electrodes E1, E2 through a common torch 111 and contact tip (not shown). Thus, the welding system 100 can be operated in either single wire mode in which only one of the electrodes is supplied during welding, or a dual wire mode in which both electrodes are supplied during welding. The wire feeder 105 can include separate drive motors for the sets of drive rolls 107a, 107b to control their operation, and each drive motor can be individually activated and deactivated and be operated at different wire feed speeds. Alternatively, the drive rolls 107a, 107b can be powered by a common motor and each set of drive rolls can be controlled by a clutch device to activate/deactivate their wire feeding. The drive rolls 107a, 107b can be operated at different speeds if desired, so that the wire feed speeds of the electrodes E1, E2 are different from each other during a deposition operation, to control the composition of the weld metal for example. FIG. 21 shows a still further example embodiment of the welding system 100 having two separate wire feeders 105a, 105b. The system in FIG. 21 can operate similarly to the system in FIG. 20 in that either of the wire electrodes E1, E2 can be fed one at a time for a single wire deposition operation, or the wire electrodes E1, E2 can be fed together for a dual wire deposition operation. In FIG. 21, the liner 114 has a common conduit trunk, and separate branches 115, 116 extending to each wire feeder 105a, 105b for conveying the wire electrodes E1, E2 to the torch 111. The liner 114 can be considered to be a Y-liner due to its overall Y shape.

Figure 22:
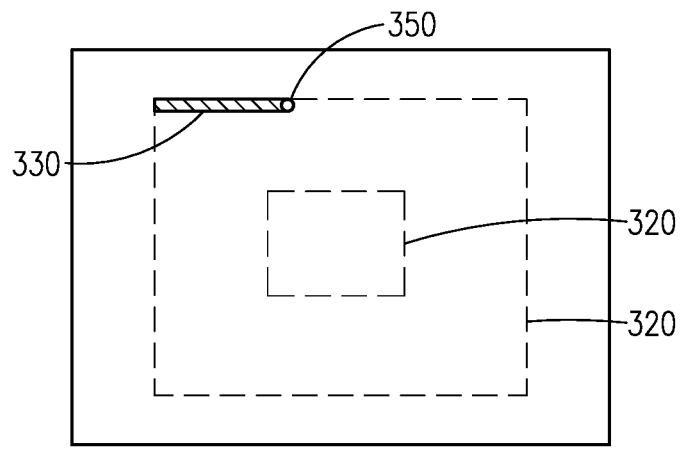
FIG. 22 illustrates an additive manufacturing deposition operation.
Figure 23:
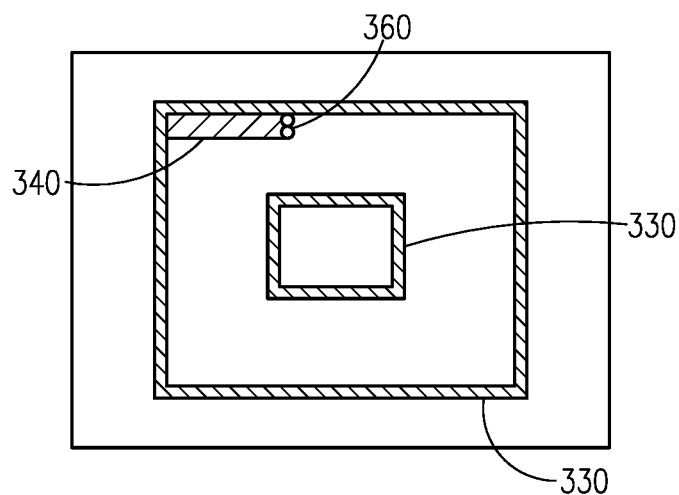
FIG. 23 illustrates an additive manufacturing deposition operation.
Figure 24:
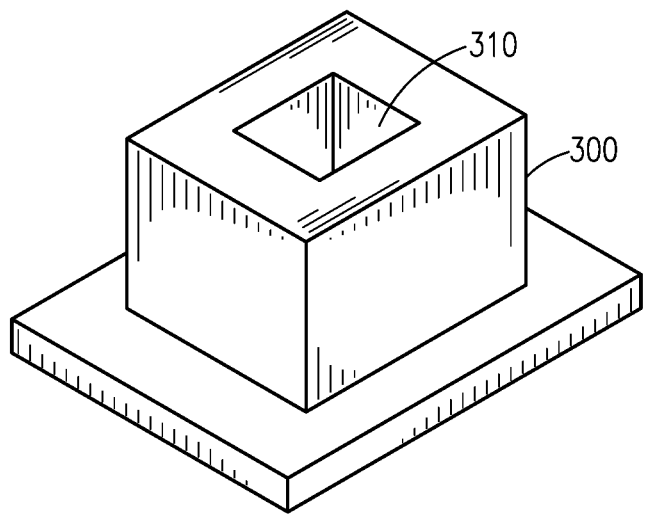
FIG. 24 illustrates an additively manufactured part.

FIGS. 22 and 23 illustrate an example deposition operation that utilizes both single wire and dual wire deposition operations together. The example deposition operation can be an additive manufacturing process, such as 3D printing, using single and dual wire welding techniques. FIG. 24 shows an example final part 300 that is built up layer by layer using the single and dual wire additive manufacturing process. The part 300 has an internal void 310 and thus has inner and outer boundaries 320. FIGS. 22 and 23 show a partial layer of the final part 300 being formed. The layers are formed by laying down "walls" 330 along the boundaries 320. The space between the walls is then filled in with metal to complete a layer. It is desirable that the walls 330 be formed with precision, using a fine resolution deposition process. The space between the walls can be filled in using a lower resolution, and preferably higher speed, deposition process. A single wire deposition operation generally provides a higher resolution (e.g., more precise placement of metal) than a dual wire deposition operation. However, a dual wire deposition operation has a higher deposition rate and, thus, is faster than single wire deposition. In an example additive manufacturing process, the walls 330 are formed using a single wire deposition operation. After the walls 330 are formed, the space between the walls is filled 340 using a dual wire deposition operation that utilizes a bridge droplet formed between the wires as discussed above. A single electrode 350 and dual electrodes 360 are shown in FIGS. 22 and 23, respectively. The layers of the final part 300 can be formed using a single welding system that can selectively feed either one or two welding electrodes to a torch, such as the welding systems shown in FIGS. 20 and 21 for example. The power supply can control the operation of the wire feeder(s) to supply one or two welding electrodes to the torch, depending on whether a finer resolution deposition is needed, or whether a higher deposition rate is desired. For example, the power supply can be configured to selectively operate a first wire feeder and a second wire feeder, in order to perform both single wire and dual wire deposition operations. The power supply can also control the welding waveform that is supplied to the torch depending on whether a single or dual wire operation is occurring.

Wall building is one example situation in which a single wire, finer resolution deposition operation can be used. A single wire deposition operation can also be used at other times when a lower deposition rate or finer resolution is desired, such as when forming overhanging portions of a part. As an alternative to a single wire deposition operation, a dual wire short circuit or short arc deposition operation can be used along the boundaries 320 of the part to form the walls 330. A short circuit deposition operation adds less heat to the molten puddle than a pulse spray process, which can help to limit the molten flow during deposition and improve the resolution of the build.

Figure 25:
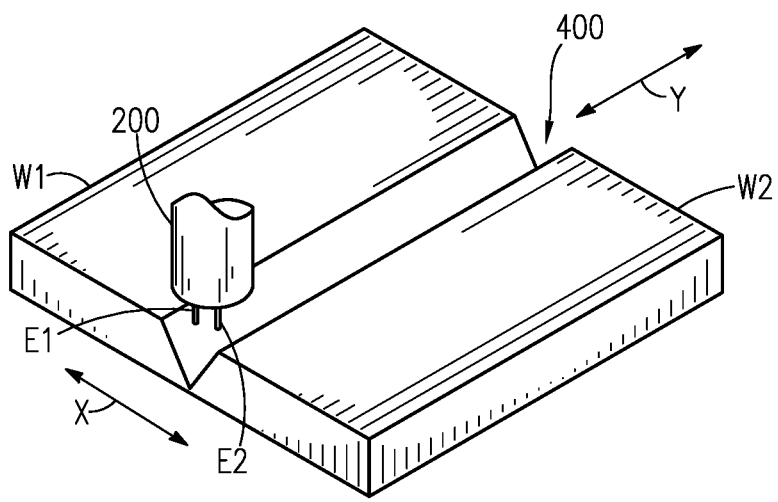
FIG. 25 illustrates an example deposition operation.

FIG. 25 illustrates an example dual wire deposition operation. The contact tip 200 of the welding torch and the dual wire electrodes E1, E2 are shown schematically in FIG. 25. During welding, the torch moves along a groove 400 (in direction Y) that forms a welding seam between two workpieces W1, W2. The torch can also be weaved back and forth (in direction X) during welding. The electrodes E1, E2 and the exit orifices of the contact tip 200 are oriented substantially perpendicular to the travel direction Y of the torch along the groove, and substantially parallel to the weave direction X. Due to the orientation of the electrodes E1, E2, the arc cone will be wider in the X direction than the Y direction. When the electrodes E1, E2 are weaved in the X direction, the larger arc cone will help to keep the molten area fluid and reduce the risk of incomplete fusion during welding. Of course, the electrodes E1, E2 and contact tip exit orifices could be oriented at any desired angle with respect to the travel and weave directions, such as parallel to the travel direction Y for example, or at a 45 degree angle with respect to the weave and travel directions.

The use of embodiments described herein can provide significant improvements in stability, weld structure and performance over known welding operations. However, in addition to welding operations, embodiments can be used in additive manufacturing operations. In fact the system 100 described above can be used in additive manufacturing operations as in welding operations. In exemplary embodiments, improved deposition rates can be achieved in additive manufacturing operations. For example, when using an STT type waveform in a single wire additive process, using an 0.045" wire can provide a deposition rate of about 5 lb/hr before becoming unstable. However, when using embodiments of the present invention and two 0.040" wires a deposition rate of 7 lbs/hr can be achieved in a stable transfer. Because additive manufacturing processes and systems are known, the details of such processes and systems need not be described herein. In such processes a bridging current, such as that descried above, can be used in the additive manufacturing current waveform.

It is noted that exemplary embodiments are not limited to the usage of the waveforms discussed above and described herein, as other welding type waveforms can be used with embodiments of the present invention. For example, other embodiments can use variable polarity pulsed spray welding waveforms, AC waveforms, etc. without departing from the spirit and scope of the present invention. For example, in variable polarity embodiments the bridge portion of the welding waveform can be done in a negative polarity such that the bridge droplet is created while reducing the overall heat input into the weld puddle. For example, when using AC type waveforms, the waveforms can have a frequency of 60 to 200 Hz of alternating negative and positive pulses to melt the two wires and form the bridge droplet between them. In further embodiments the frequency can be in the range of 80 to 120 Hz.

As explained previously, embodiments of the present invention can be used with different types and combinations of consumables including flux cored consumables. In fact, embodiments of the present invention can provide a more stable welding operation when using flux cored electrodes. Specifically, the use of a bridging droplet can aid in stabilizing flux core droplets that can tend to be unstable in a single wire welding operation. Further, embodiments of the present invention allow for increased weld and arc stability at higher deposition rates. For example, in single wire welding operations, at high current and high deposition rates the transfer type for the droplets can change from streaming spray to a rotational spray, which appreciably reduces the stability of the welding operation. However, with exemplary embodiments of the present invention the bridge droplet stabilizes the droplets which significantly improves arc and weld stability at high deposition rates, such as those above 20 lb/hr.

Additionally, as indicated above the consumables can be of different types and/or compositions, which can optimize a given welding operation. That is, the use of two different, but compatible, consumables can be combined to create a desired weld joint. For example, compatible consumables including hardfacing wires, stainless wires, nickel alloys and steel wires of different composition can be combined. As one specific example a mild steel wire can be combined with an overalloyed wire to make a 309 stainless steel composition. This can be advantageous when a single consumable of the type desired does not have desirable weld properties. For example, some consumables for specialized welding provide the desired weld chemistry but are extremely difficult to use and have difficulty providing a satisfactory weld. However, embodiments of the present invention can allow for the use of two consumables that are easier to weld with to be combined to create the desired weld chemistry. Embodiments of the present invention can be used to create an alloy/deposit chemistry that is not otherwise commercially available, or otherwise very expensive to manufacture. Thus, two different consumables can be used to obviate the need for an expensive or unavailable consumable. Further, embodiments can be used to create a diluted alloy. For example, a first welding wire could be a common inexpensive alloy and a second welding wire could be a specialty wire. The desired deposit would be the average of the two wires, mixed well in the formation of the bridged droplet, at the lower average cost of the two wires, over an expensive specialty wire. Further, in some applications, the desired deposit could be unavailable due to the lack of appropriate consumable chemistry, but could be reached by mixing two standard alloy wires, mixed within the bridged droplet and deposited as a single droplet. Further, in some applications, such as the application of wear resistance metals, the desired deposit may be combination of tungsten carbide particles from one wire and chrome carbide particles from another. Still in another application, a larger wire housing larger particles within is mixed with a smaller wire containing fewer particles or smaller particles, to deposit a mixture of the two wires. Here the expected contribution from each of the wires is proportional to the size of wire given the wire feed speeds are same. In yet another example, the wire feed speeds of the wires are different to allow the alloy produced to change based on the desired deposit but the mixing of the wires is still produced by the bridged droplet created between the wires.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the following claims.

What is claimed is:

1. A welding or additive manufacturing system, comprising:
    a power supply comprising a controller which controls operation of said power supply, where said power supply provides a current waveform to a contact tip assembly having a first bore terminating at a first exit orifice and a second bore terminating at a second exit orifice, where said first exit orifice is configured to deliver a first wire electrode and said second exit orifice is configured to deliver a second wire electrode, wherein the current waveform has a frequency and includes a bridge current portion and a further current portion having a current level different from the bridge current portion;
    wherein the first and second exit orifices are separated from each other by a distance configured to facilitate formation of a bridge droplet between the first wire electrode delivered through the first bore and the second wire electrode delivered through the second bore, while preventing solid portions of the first wire electrode delivered through the first bore from contacting solid portions of the second wire electrode delivered through the second bore, during a deposition operation in which the current waveform is conducted to both of the first wire electrode and the second wire electrode simultaneously through the contact tip assembly, wherein a current due to the current waveform flows from the contact tip assembly to the bridge droplet through both of the first wire electrode and the second wire electrode and the current is divided between the first wire electrode and the second wire electrode, and wherein the current flows from the bridge droplet to a workpiece during the deposition operation, and wherein the bridge droplet between the first wire electrode and the second wire electrode forms during the bridge current portion of the current waveform.

2. The welding or additive manufacturing system of claim 1, further comprising at least one wire feeder, wherein the at least one wire feeder is configured to drive one or both of the first wire electrode and the second wire electrode through the contact tip assembly.

3. The welding or additive manufacturing system of claim 1, wherein a wire feed speed of the first wire electrode is different from a wire feed speed of the second wire electrode during the deposition operation.

4. The welding or additive manufacturing system of claim 1, wherein an orientation of the first exit orifice and the second orifice is substantially perpendicular to a travel direction of the contact tip assembly during the deposition operation.

5. The welding or additive manufacturing system of claim 1, wherein the first exit orifice has a diameter, and said distance is within a range of 20% to 200% of said diameter.

6. The welding or additive manufacturing system of claim 5, wherein the bridge current portion includes a current ramp, and wherein a deposition rate of the deposition operation is in a range of 19 to 26 lbs/hr.

7. The welding or additive manufacturing system of claim 6, wherein the further current portion is a background current portion, and the current level of the background current portion is lower than a current level of the bridge current portion, and wherein the first bore is parallel with the second bore.

8. The welding or additive manufacturing system of claim 6, wherein the further current portion is a peak current portion, and the current level of the peak current portion is greater than a current level of the bridge current portion, and wherein the first bore is parallel with the second bore.

9. The welding or additive manufacturing system of claim 1, wherein said distance provides a spacing between the first wire electrode and the second wire electrode that is within a range of 0.25 to 2.25 times a diameter of the first and second wire electrodes, as measured between closest edges of the first and second wire electrodes.

10. The welding or additive manufacturing system of claim 1, wherein the first bore is parallel with the second bore and said distance is less than 3 mm.

11. The welding or additive manufacturing system of claim 10, wherein the bridge current portion includes a current ramp, and wherein a deposition rate of the deposition operation is in a range of 19 to 26 lbs/hr.

12. The welding or additive manufacturing system of claim 11, wherein the further current portion is a background current portion, and the current level of the background current portion is lower than a current level of the bridge current portion.

13. The welding or additive manufacturing system of claim 11, wherein the further current portion is a peak current portion, and the current level of the peak current portion is greater than a current level of the bridge current portion.

14. A welding or additive manufacturing system, comprising:

a power supply comprising a controller which controls operation of said power supply, where said power supply provides a current waveform to a contact tip assembly having a first bore terminating at a first exit orifice and a second bore terminating at a second exit orifice, wherein the current waveform has a frequency and includes a bridge current portion and a further current portion having a current level different from the bridge current portion;

a first wire feeder that delivers a first wire electrode through the first exit orifice; and a second wire feeder that delivers a second wire electrode through the second exit orifice;

wherein the first and second exit orifices are separated from each other by a distance configured to facilitate formation of a bridge droplet between the first wire electrode delivered through the first bore and the second wire electrode delivered through the second bore, while preventing solid portions of the first wire electrode delivered through the first bore from contacting solid portions of the second wire electrode delivered through the second bore, during a deposition operation in which the current waveform is conducted to both of the first wire electrode and the second wire electrode simultaneously through the contact tip assembly, wherein a current due to the current waveform flows from the contact tip assembly to the bridge droplet through both of the first wire electrode and the second wire electrode and the current is divided between the first wire electrode and the second wire electrode, and wherein the current flows from the bridge droplet to a workpiece during the deposition operation, and wherein the bridge droplet between the first wire electrode and the second wire electrode forms during the bridge current portion of the current waveform.

15. The welding or additive manufacturing system of claim 14, wherein a wire feed speed of the first wire electrode is different from a wire feed speed of the second wire electrode.

16. The welding or additive manufacturing system of claim 14, wherein the power supply is configured to selectively operate the first wire feeder and the second wire feeder to perform both single wire and dual wire deposition operations.

17. The welding or additive manufacturing system of claim 14, wherein the contact tip assembly comprises a distal end face and the first exit orifice is substantially centered along the distal end face, and the second exit orifice is offset from a center of the distal end face.

18. The welding or additive manufacturing system of claim 14, wherein the first exit orifice has a diameter, and said distance is within a range of 20% to 200% of said diameter.

19. The welding or additive manufacturing system of claim 14, wherein said distance provides a spacing between the first wire electrode and the second wire electrode that is within a range of 0.25 to 2.25 times a diameter of the first and second wire electrodes, as measured between closest edges of the first and second wire electrodes.

20. The welding or additive manufacturing system of claim 14, wherein said distance is less than 3 mm.

21. A welding or additive manufacturing system, comprising:

a power supply comprising a controller which controls operation of said power supply, where said power supply provides a current waveform to a contact tip assembly having a first bore terminating at a first exit orifice and a second bore terminating at a second exit orifice, where said first exit orifice is configured to deliver a first wire electrode and said second exit orifice is configured to deliver a second wire electrode, wherein the current waveform has a frequency and includes a bridge current portion and a further current portion having a current level different from the bridge current portion;

at least one wire feeder, wherein the at least one wire feeder drives the first wire electrode through the first bore and the second wire electrode through the second bore;

wherein the first and second exit orifices are separated from each other by a distance configured to facilitate formation of a bridge droplet between the first wire electrode delivered through the first bore and the second wire electrode delivered through the second bore, while preventing solid portions of the first wire electrode delivered through the first bore from contacting solid portions of the second wire electrode delivered through the second bore, during a deposition operation in which the current waveform is conducted to both of the first wire electrode and the second wire electrode simultaneously through the contact tip assembly, wherein a current due to the current waveform flows from the contact tip assembly to the bridge droplet through both of the first wire electrode and the second wire electrode and the current is divided between the first wire electrode and the second wire electrode, and wherein the current flows from the bridge droplet to a workpiece during the deposition operation, and wherein the bridge droplet between the first wire electrode and the second wire electrode forms during the bridge current portion of the current waveform.

22. The welding or additive manufacturing system of claim 21, wherein a wire feed speed of the first wire electrode is different from a wire feed speed of the second wire electrode.

23. The welding or additive manufacturing system of claim 21, wherein the power supply is configured to control the at least one wire feeder to perform both single wire and dual wire deposition operations.

24. The welding or additive manufacturing system of claim 21, wherein the contact tip assembly comprises a distal end face and the first exit orifice is substantially centered along the distal end face, and the second exit orifice is offset from a center of the distal end face.

25. The welding or additive manufacturing system of claim 21, wherein an orientation of the first exit orifice and the second orifice is substantially perpendicular to a travel direction of the contact tip assembly during the deposition operation.

26. The welding or additive manufacturing system of claim 21, wherein the first exit orifice has a diameter, and said distance is within a range of 20% to 200% of said diameter.

27. The welding or additive manufacturing system of claim 26, wherein the bridge current portion includes a current ramp, and wherein a deposition rate of the deposition operation is in a range of 19 to 26 lbs/hr.

28. The welding or additive manufacturing system of claim 27, wherein the further current portion is a background current portion, and the current level of the background current portion is lower than a current level of the bridge current portion, and wherein the first bore is parallel with the second bore.

29. The welding or additive manufacturing system of claim 27, wherein the further current portion is a peak current portion, and the current level of the peak current portion is greater than a current level of the bridge current portion, and wherein the first bore is parallel with the second bore.

30. The welding or additive manufacturing system of claim 21, wherein said distance provides a spacing between the first wire electrode and the second wire electrode that is within a range of 0.25 to 2.25 times a diameter of the first and second wire electrodes, as measured between closest edges of the first and second wire electrodes.

31. The welding or additive manufacturing system of claim 21, wherein the first bore is parallel with the second bore and said distance is less than 3 mm.

32. The welding or additive manufacturing system of claim 31, wherein the bridge current portion includes a current ramp, and wherein a deposition rate of the deposition operation is in a range of 19 to 26 lbs/hr.

33. The welding or additive manufacturing system of claim 32, wherein the further current portion is a background current portion, and the current level of the background current portion is lower than a current level of the bridge current portion.

34. The welding or additive manufacturing system of claim 32, wherein the further current portion is a peak current portion, and the current level of the peak current portion is greater than a current level of the bridge current portion.

* * * * *